(12) United States Patent
Gay et al.

(10) Patent No.: US 7,991,629 B2
(45) Date of Patent: Aug. 2, 2011

(54) SYSTEM AND METHOD FOR THE ASSESSMENT, PRICING, AND PROVISIONING OF DISTANCE-BASED VEHICLE INSURANCE

(75) Inventors: Chris Gay, Dallas, TX (US); John C. McKinney, Elmo, TX (US); Leonard D. Duncan, Rockwall, TX (US); Jeffrey R. Fellows, Addison, TX (US)

(73) Assignee: MileMeter, Inc., Dallas, TX (US)

( * ) Notice: Subject to any disclaimer, the term of this patent is extended or adjusted under 35 U.S.C. 154(b) by 503 days.

(21) Appl. No.: 11/685,947

(22) Filed: Mar. 14, 2007

(65) Prior Publication Data
US 2007/0156468 A1  Jul. 5, 2007

Related U.S. Application Data

(63) Continuation-in-part of application No. 11/563,557, filed on Nov. 27, 2006, which is a continuation-in-part of application No. 10/977,712, filed on Oct. 29, 2004.

(60) Provisional application No. 60/803,837, filed on Jun. 2, 2006.

(51) Int. Cl.
*G06Q 40/00* (2006.01)

(52) U.S. Cl. .......................................... 705/4
(58) Field of Classification Search .................. 705/4
See application file for complete search history.

(56) References Cited

U.S. PATENT DOCUMENTS

| | | | |
|---|---|---|---|
| 5,797,134 A | 8/1998 | McMillan et al. | |
| 6,064,970 A | 5/2000 | McMillan et al. | |
| 2001/0044733 A1 | 11/2001 | Lee et al. | |
| 2003/0033173 A1 | 2/2003 | Suzuki et al. | |
| 2003/0093302 A1* | 5/2003 | Quido et al. | 705/4 |
| 2003/0236686 A1 | 12/2003 | Matsumoto et al. | |
| 2004/0039611 A1 | 2/2004 | Hong et al. | |
| 2006/0009885 A1* | 1/2006 | Raines et al. | 701/1 |

FOREIGN PATENT DOCUMENTS
WO   PCTUS0865663   8/2008

OTHER PUBLICATIONS

Cents-Per-Miles Choice for Car Insurance, Frequently Asked Questions, http://www.centspermilesnow.org/faq.htm, 2002.*
Basing Auto Insurance on Exact Odometer Readings: Another Pricing Innovation From Progressive Direct, Business Wire, New York: Feb. 27, 2006. p. 1.*

(Continued)

*Primary Examiner* — James Kramer
*Assistant Examiner* — Hao Fu
(74) *Attorney, Agent, or Firm* — Fellers, Snider, Blankenship, Bailey & Tippens, P.C.

(57) ABSTRACT

A method of assessing, pricing, and provisioning distance-based vehicle insurance is disclosed. The method includes receiving a vehicle identification number of a vehicle to be insured from a customer, receiving an preliminary odometer reading of the vehicle to be insured from the customer, and obtaining from the customer a legally binding declaration that the preliminary odometer reading is true and accurate. The method includes insuring the vehicle during a policy period defined by coverage for a preselected number of units distance from the preliminary odometer reading.

15 Claims, 21 Drawing Sheets

OTHER PUBLICATIONS

Butler et al., "Sex-Divided Mileage, Accident, and Insurance Cost Data Show that Auto Insurers Overcharge Most Women," *Journal of Insurance Regulation*, National Association of Insurance Commissioners, Mar./Jun. 1988, vol. 6, No. 3 and 4, pp. 373-420.
Butler, "Insurance Department 'Catch 22' Shields Auto Insurers from Consumer Challenges," *Journal of Insurance Regulation*, National Association of Insurance Commissioners, Mar. 1989, vol. 7, No. 3, pp. 285-289.
Butler, "Driver Record: a Political Red Herring that Reveals the Basic Flaw in Automobile Insurance Pricing," *Journal of Insurance Regulation*, National Association of Insurance Commissioners, Dec. 1989, vol. 8, No. 2, pp. 200-234.
Butler, "Unmetered Premiums Subsidize Overuse of Automobile Transportation," *The Journal of Actuarial Profession*, American Academy of Actuaries, vol. 2, No. 3, May/Jun. 1990.
Butler, "Cost-Based Pricing of Individual Automobile Risk Transfer: Car-Mile Exposure Unit Alanysis (And reply to discussions by R. Cardoso and R. Woll)" *Journal of Actuarial Practice*, 1993, vol. 1, pp. 51-84.
Butler, "Discussion of the Paper 'On the Use of Accident or Conviction Counts to Trigger Action' by E. Hauer et al." *Transportation Research Record*, 1401,1993.
Butler, "Operation of an Audited-Mile/Year Auto Insurance System under Pennsylvania Law," Washington, D.C., 1992, reprinted by *The Casualty Actuarial Society Forum*, Summer 1993.
"Leading Writers of Total Auto Insurance Table 1" and "Leading Writers of Private Passenger Auto Insurance Table 2," *Best's Review*, Oct. 1995.
Butler, "Discussion of Robert L. Brown's 'Recent Canadian Human Rights Decisions Having an Impact on Gender-Based Risk Classification Systems,'" *Journal of Actuarial Practice*, 1995, vol. 3, pp. 181-190.
"Leading Writers of Total Auto Insurance" and "Leading Writers of Private Passenger Auto Insurance," *Best's Review*, Oct. 1996.
Butler, "Automobile Insurance Pricing: Operating Cost versus Ownership Cost; the Implications for Women," Chapter 39, Proceedings of the $2^{nd}$ National Conference on Women's Travel Issues, Baltimore, MD, Oct. 23-26, 1996.
"Development of Speed Correction Cycles Prepared by Sierra Research, Inc." Document No. M6.SPD.001, U.S. EPA Assessment and Modeling Division National Vehicle Fuel and Emissions Laboratory, Jun. 26, 1997.
"Leading Writers of Private Passenger Auto" and "Leading Writers of Total Auto Lines," *Best's Review*, Oct. 1997, pp. 35-36.
"Technical Methods for Analyzing Pricing Measures to Reduce Transportation Emissions," United States Envorinmental Protection Agency, EPA 231-R-98-006, Aug. 1998.
"Auto Physical Damage," "Total Auto Lines," "All Private Passenger Auto," and " Auto Liability" Tables, *Best's Review*, Oct. 1998, pp. 32-35 and 38-40.
"1998 Auto by Line," *Best's Review*, Oct. 1999, pp. 39-40.
Butler, "Why the Standard Automobile Insurance Market Breaks Down in Low-Income Zip Codes," NOW Report to the Texas Legislature, Jul. 2000.
"Comparative Information on Transport Prices and Taxation Across Europe," *T&E European Federation for Transport and Environment*, Brussels, Sep. 2000.
Goch, "Car Wars," *Best's Review*, Oct. 2000, pp. 34-36, 38.
"1999 All Private-Passenger Auto," *Best's Review*, Oct. 2000, pp. 43-44.
Glover et al., "Trip Length Activity Factors for Running Loss and Exhaust Running Emissions," Document No. EPA 420-R-01-013, Report No. M6.FLT.005, U.S. EPA Assessment and Modeling Division, Apr. 2001.
Beardsley, "Development of Speed Correction Cycles," Document No. EPA 420-R-01-042, M6-SPD.001, Original report by Sierra Research Apr. 30, 1997, U.S. Environmental Protection Agency, Jul. 2001.
Panko, "Making a Dent in Auto Insurance Fraud," *Best's Review*, Oct. 2001, pp. 65-68, 70, 72-24, 76,86.

The I.I.I. Insurance Fact Book 2002, "U.S. Insurance Industry," pp. 11-26, 30, 32-36, 38-59, 97-107, 115-126, 132-142, 144.
Paul, "Advocating Mileage-Based Auto Insurance," *Conservation Matters*, Spring 2002, Conservation Law Foundation, www.clf.org.
"Goodbye Gridlock: Improving the way Oregon funds transportation," A Report by the Oregon Environmental Council, Apr. 2002.
Goch, "What Works Online," *Best's Review*, May 2002, pp. 24-26, 28, 30-34.
"Auto Reinsurance Assumed, Top Writers 2001," *Best's Review*, Aug. 2002, pp. 38.
Braun, "Hit from Behind," *Best's Review*, Oct. 2002, pp. 59-61.
Panko, "Beyond Repair," *Best's Review*, Oct. 2002, pp. 62-64, 66, 68-70, 72, 74-76.
Brady, "Groups Propose Mileage-Based Car Insurance,"Oregon Public Broadcasting, Dec. 13, 2002.
"Consumer Advocates Question Offering Insurance at Kiosks," www.atmmarketplace.com, Dec. 17, 2002.
"2003 Best's Insurance Reports—Property/Casualty," *AM Best 2003 Edition*, pp. vii-xxii, 784-786, 2027, 2132-2137, 3320-3326, 3963-3964, 3950-3954.
Butler, "Pay-per-mile Auto Insurance," Gaman, *Consumer Economic Issues in America, $8^{th}$ Edition*, 2003, pp. 1-2.
Jacklet, "Pay As You Drive' Policies Get Boost," *Business Tribune*, Portland, Oregon, Jan. 10, 2003.
Litman, "Distance-based Vehicle Insurance—As a TDM Strategy," Victoria Transport Policy Institute, Mar. 24, 2003, pp. 1-26.
"Pay-as-you-drive Insurance Bill Heads to House Floor," Press Release, Oregon Environmental Council, Apr. 14, 2003.
Wright, "Insurance Bill Trades Miles for Cash," *The Register-Guard*, Salem, Oregon, Apr. 23, 2003.
"House Passes 'pay-as-you-drive' Insurance Bill," Press Release, Oregon Environmental Council, Apr. 23, 2003.
"Oregon Passes First-of-its-kind Bill in Nation to Promote 'Pay-as-you-drive' Auto Insurance," Press Release, Oregon Environmental Council, Jun. 19, 2003.
Goch, "Gearing Up," *Best's Review*, Oct. 2003, pp. 20-24, 26, 28-30, 32, 34, 36.
Anastasiadis, "Reconciling—Environmental and Social Transport Policies," *T&E European Federation for Transport and Environment*, 2004.
"Sense and Sustainability—Smart Thinking to Restart European Transport Policy," *T&E European Federation for Transport and Environment*, T&E/Stichting Natuur en Milieu publication, 2004, pp. 1-28.
Butler, "Are Low-Income Drivers High Risk-or Victims of Adverse Selection Induced by Pay-Per-Car Premiums?" Annual Meeting of Western Risk & Insurance Association, Jan. 2004, pp. 1-14.
"MEP's Angry at Time Pressure on TENS Guidelines . . . and Over Rush to Push Eurovignette Through," *T&E Bulletin—News from the European Federation for Transport and Environment*, No. 125, Feb. 2004.
*T&E Bulletin—News from the European Federation for Transport and Environment*, No. 126, Mar. 2004.
"European Parliament Steps Towards Getting Transport's Prices Right," *T&E European Federation for Transport and Environment News Release*, Brussels, Apr. 21, 2004.
"So What Would You Ask Your Potential MEP?" *T&E Bulletin—News from the European Federation for Transport and Environment*, Special Feature, May 2004.
"MEPs Support True Prices and User Pays Principle for Europe's Lorries," *T&E Bulletin—News from the European Federation for Transport and Environment*, No. 128, May 2004.
"New States Show Leadership in Pricing for Trucks," *T&E Bulletin—News from the European Federation for Transport and Environment*, No. 129, Jun. 2004.
Butler, "An Alternative to the High-Risk-Driver Theory: Adverse Selection Induced by Per-Car Premiums," Annual Meeting of the American Risk & Insurance Association in Chicago, Aug. 2004, pp. 1-24.
Green, "O Canada!" *Best's Review*, Oct. 2004, pp. 33-50.
"Another Three Years to Create 'Green Skies'," *T&E Bulletin—News from the European Federation for Transport and Environment*, No. 133, Nov. 2004.

"External Costs of Transport 'underestimates' at 650EUR billion," *T&E Bulletin—News from the European Federation for Transport and Environment*, No. 134, Dec. 2004.

"State Insurance Department Websites," The National Association of Insurance Commissioners, www.naic.org.

"Insurance Related Data," Insurance Information Institute, www.iii.org.

"Best's Ratings and Analysis," AM Best, the Insurance Information Source, www.ambest.com.

"Annual Report 2004," Texas Department of Insurance.

Insurance & Technology Home page, www.insurancetech.com.

Insurance Journal Home page, www.insurancejournal.com.

Risk & Insurance, www.riskandinsurance.com.

Claims Magazine—Covering the Business of Loss, www.claimsmag.com.

"Why did the Texas Legislature pass the cents-per-mile choice law?" www.CentsPerMileNow.org.

"Online Transportation Demand Management (TDM) Encyclopedia," www.vtpo.org.

"Our Approach to Problem Solving," www.vtpi.org.

"Value Pricing Pilot Program," www.fhwa.dot.gov.

"Vehicle Use Pricing," Value Pricing Homepage, www.valuepricing.org.

"What is Value Pricing?" Value Pricing Homepage, www.valuepricing.org.

"What is Project XL?" United States Environmental Protection Agency, www.epa.gov/projectxl/file2.htm.

"Developing Pay-Per-Mile Auto Insurance," CLF Ventures, Inc., www.clfventures.org/eia,html.

"Transportation Solutions," Oregon Environmental Council, www.orcouncil.org/pollution/transportationoptions.htm.

"Pay As You Drive Insurance," Oregon Environmental Council, www.orcouncil.org/pollution/PAYD.htm.

QuoteSmith—official site, www.insure.com.

Community Forum on www.motorcyclenews.com/MCN/community/Forums/ regarding pay by the mile insurance.

Eisenberg, Anne, "What's Next; Paying for Car Insurance by the Mile." *The New York Times*, www.nytimes.com, Apr. 20, 2000.

Leboeuf Lamb, "State Insurance Legislation & Regulatory Developments: Dec. 13, 2001-Jan. 17, 2002." LeBoeuf, Lamb, Greene & MacRae LLP, www.llgm.com, Jan. 2002.

Nerad, Jack R. "Insurance by the Mile." Classic Car Feature Article #102504, www.antiquecar.com.

Weekly Car Guide: Aug. 13, 2004. www.thecarconnection.com.

Baker, Dean, "Insurance by the Mile: A Simple Way to Slow Global Warming." Center for Economic and Policy Research, Jun. 1, 2006. www.cepr.net.

McCutcheon, Chuck, "Buying auto insurance by the mile: Goal is to discourage driving to save money, conserve fuel." *Grand Rapids Press*, Grand Rapids, Michigan. Aug. 6, 2006.

Bensini, "'Pay-As-You-Go' Car Insurance", "www.halfbakery.com/idea/_22Pay-As-You-Go_22_20Car_20Insurance", Jan. 24, 2003.

New York Times, "Insurance Game Pits Men Against Women: Letter to the Editor", The New York Times, May 14, 1994.

* cited by examiner

Make your coverage selections...

Step 2 of 5

Essentials

| | Bodily Injury Liability | Property Damage Liability | Cost |
|---|---|---|---|
| ⦿ Recommended | $100,000 per person, $300,000 per accident | $50,000 | 3.6 cents per mile |
| ○ Economy | $50,000 per person, $100,000 per accident | $30,000 | 3.2 cents per mile |
| ○ Minimal | $20,000 per person, $40,000 per accident | $15,000 | 2.7 cents per mile |

"Bodily injury liability" is for injuries you cause to other persons.
"Property damage liability" is for damage you cause to the property (vehicles, structures, land, etc.) of others.

Extras

| | Description | Cost |
|---|---|---|
| ☑ Collision | I want to insure my vehicle for damage resulting from a collision. | 1.6 cents per mile |
| ☑ Comprehensive | I want to insure my vehicle for damage from theft, hail, flood and fire. | 0.4 cents per mile |
| ☐ Roadside Assistance | I want nationwide emergency roadside assistance. | 0.2 cents per mile |
| ☑ Rental Car | Rental car reimbursement (for accidents). | Included for all of our customers! |

"Collision" insurance is for damage to your vehicle resulting from a collision, with a $500 deductible.
"Comprehensive" insurance is for damage to your vehicle for anything other than a collision (theft, hail, flood, fire), with a $500 deductible.
"Roadside assistance" is for costs related to emergency servicing of your vehicle (dead battery, flat tire, etc.).

( Next )

Fig. 5

Buy your insurance...

Your Credit Card Information

First Name:      Middle Initial: [ ]    Last Name: [ ]

Address:

City:      State: [ ▼ ]    Zip Code: [ ]

Card: [ Visa ▼ ]

Number:

Expiration: [ 01 ▼ ] [ 2005 ▼ ]

---

Confirm Your Purchase

Vehicle:      1996 Volvo 850 Wagon
Driver:      Mr. J.R. Ewing
Liability Coverage:      100/300/50
Collision Coverage:      Yes
Comprehensive Coverage:      Yes
Roadside Assistance:      Declined
Miles of Coverage:      5,000 miles
Purchase Cost:      $280.00

[ Purchase ]

Step 4 of 5

Print your insurance cards...  Step 5 of 5

M 1 7 M 3 1 3 R

MiléMeter
Car insurance by the mile.™

Vehicle: White 1996 Volvo 850 Wagon
Vehicle VIN: 1XY2AZ56GHISL33
Vehicle License: TX AZ5-83G
Policyholder: Mr. J.R. Ewing
Registered Address: 9050 Markville Drive, Dallas, TX, 75243

Policy Number: TX89144590
Policy Start: Odometer reading of 50,000 miles.
Policy End: Odometer reading of 65,000 miles.

This policy is only valid if the odometer reading on the specified vehicle is within the "Policy Start" and "Policy End" limits described above. If you have any questions regarding the validity of this policy, please contact us (please have the policy number and vehicle odometer reading ready) using the contacts listed below.

www.milemeter.com    1-800-4-CHANGE (Print this card twice)

TYPE: DISTANCE

POLICY START: Odometer reading of 50,000 miles
POLICY END: Odometer reading of 55,000 miles

TYPE: ADJUSTED TERM (TERM WITH ACTUAL USAGE)

POLICY START: January 1, 2005
POLICY END: December 31, 2005
PREMIUM: $0.05 per mile
POLICY SIZE 10,000 miles At the end of your term, you will be credited or debited based upon the actual odometer reading of your vehicle. Any credit/debit for unused/used miles will be at the stated premium rate.

Fig. 15

Step 1

Buy / Renew Your Policy — Step 1 of 5

First Name
mike

Last Name
daul

Date of Birth (MM-DD-YYYY)
01-25-1976

Gender
Male

State and Zip Code
TX  75214

Other Household Drivers for this Auto?
0

Vehicle ID Number (VIN)
1N4DL01D8XC213416

Odometer Mileage
50000

Step 2

Choose Coverage — Step 2 of 5

| Essentials | Bodily Injury Liability | Property Damage Liability | Cost |
|---|---|---|---|
| ◉ Recommended | $100,030 per person, $300,030 per accident | $50,030 | 5.73 cents per mile |
| ◉ Economy | $50,030 per person, $100,030 per accident | $25,030 | 4.64 cents per mile |
| ◉ Minimal | $20,030 per person, $40,030 per accident | $15,030 | 3.79 cents per mile |

"Bodily injury liability" is for injuries you cause to other persons.
"Property damage liability" is for damage you cause to the property (vehicles, structures, land, etc.) of others.

| Extras | Description | Cost |
|---|---|---|
| ☐ Physical Damage | Coverage for collision, theft, fire, hail or flood, with a $500 deductible. | 4.11 cents per mile |
| ☐ Towing and Vehicle Rental | Towing reimbursement of up to $40, and vehicle rental reimbursement of up to $25/day (max $500). | 0.13 cents per mile |
| ☑ Uninsured Motorist | Coverage for collision with an uninsured motorist at the same limits as your liability coverage. | 0.78 cents per mile |
| ☐ Personal Injury Protection | Coverage for personal injury up to $2,530. | 0.84 cents per mile |
| Policy Fee | Fee for administration of policy. | 0.8 cents per mile |

(Next)

Step 3

How Many Miles Do You Want? — Step 3 of 5

6.2¢         ×         2,000         =         $124.00
Per Mile              Miles                   Total Cost

- Your policy rate is fixed — but you control how many miles you drive. The average vehicle is driven 1,000 miles each month. You may purchase additional miles at any time!

- Your policy will expire at the soonest occurrence of an odometer reading of 62,000 or the conclusion of 25 February 2007.

- If you renew prior to expiration, you will not lose your unused miles! With a timely renewal, your unused miles are added to your renewal policy purchase (and its expiration date).

(Next)

FIG. 19

Step 4

Buy Your Insurance — Step 4 of 5

Drivers and Vehicle Covered

| | |
|---|---|
| Primary Driver: | CHRISTOPHER E GAY (Named Insured) |
| Secondary Drivers: | none |
| Registered Address: | 7027 CASA LOMA AVE, DALLAS, TX 75214 |
| Vehicle and VIN: | 1999 Chevrolet Venture, 1GNDX03E5XD240420 |
| Assessed Vehicle Value: | 7,150 |
| GVWR (weight): | 5,357 lbs. |
| Odometer Reading: | 60,000 miles at time of application. |

Current Coverages and Limits

| | |
|---|---|
| Liability Coverage: | $50,030 per person, $100,030 per accident for bodily injury. $25,030 for property liability. |
| Physical Damage Coverage: | Declined |
| Towing & Vehicle Rental: | Declined |
| Uninsured Motorist: | At same limits as your liability coverage. |
| Personal Injury Protection: | Declined |

Premium Paid

| | |
|---|---|
| Liability: | 4.64¢ per mile |
| UM/UIM: | 0.76¢ per mile |
| Policy Fee: | 0.8¢ per mile |
| Total Rate: | 6.2¢ per mile |
| Miles Purchased: | 2,000 |
| Total Policy Cost: | $108.00 |

Policy Period

Expires at the soonest occurrence of 25 February 2007 or an odometer reading greater than 62,000 miles.

Lienholder Information

If you purchased this vehicle with a loan or credit, do you still have payments remaining? ● No  ○ Yes

Coverage Rejections

[CG] initials – I hereby reject Personal Injury Protection Coverage.

FIG. 20

| Billing - Step 5 of 5 | ☒ |
|---|---|

Name on Credit Card: _____

☐ Master Card    ☐ American Express

☐ Visa

Number: _____

CCV Code: ____

Billing Address                          Garaging Address

_____ Street        _____ Street

_____ City          _____ City

☐ State  ____ Zip      ☐ State  ____ Zip

[ Submit ]

FIG. 22

SYSTEM AND METHOD FOR THE ASSESSMENT, PRICING, AND PROVISIONING OF DISTANCE-BASED VEHICLE INSURANCE

CROSS REFERENCE TO RELATED APPLICATIONS

This application is a continuation-in-part of U.S. patent application Ser. No. 11/563,557, filed Nov. 27, 2006, which is hereby incorporated by reference. This application claims the benefit of U.S. Provisional Patent Application No. 60/803,837, filed Jun. 2, 2006, which is hereby incorporated by reference.

BACKGROUND OF THE INVENTION

Conventional methods for pricing and selling vehicle insurance are generally based upon time periods (e.g., months or years), also known as terms. An applicant's data, such as age, sex, location of residence, and driving record are combined with other factors to create an actuarial class, which is then used to arrive at a price. This price is then associated with a unit of exposure. In conventional insurance, the unit of exposure is a period of time (a term). As the insurance contract is then principally defined based upon the exposure unit, conventional insurance contracts are principally defined by the term. However, such conventional insurance mixes a fixed cost with a variable usage pattern. Among other disadvantages, this approach penalizes low mileage customers.

Accordingly, what is needed is an improved system and method for addressing such issues.

BRIEF DESCRIPTION OF THE DRAWINGS

FIGS. 4-8 are exemplary screenshots illustrating various displays of the system of FIG. 2.

FIG. 14 is a diagram of a portion of one embodiment of a distance-based insurance policy.

FIG. 15 is a diagram of a portion of one embodiment of an adjusted term insurance policy.

FIGS. 17-22 are exemplary screenshots illustrating various displays that could be implemented by the system of FIG. 2 or other systems according to the present disclosure.

DETAILED DESCRIPTION OF THE PREFERRED EMBODIMENTS

Figure 1:
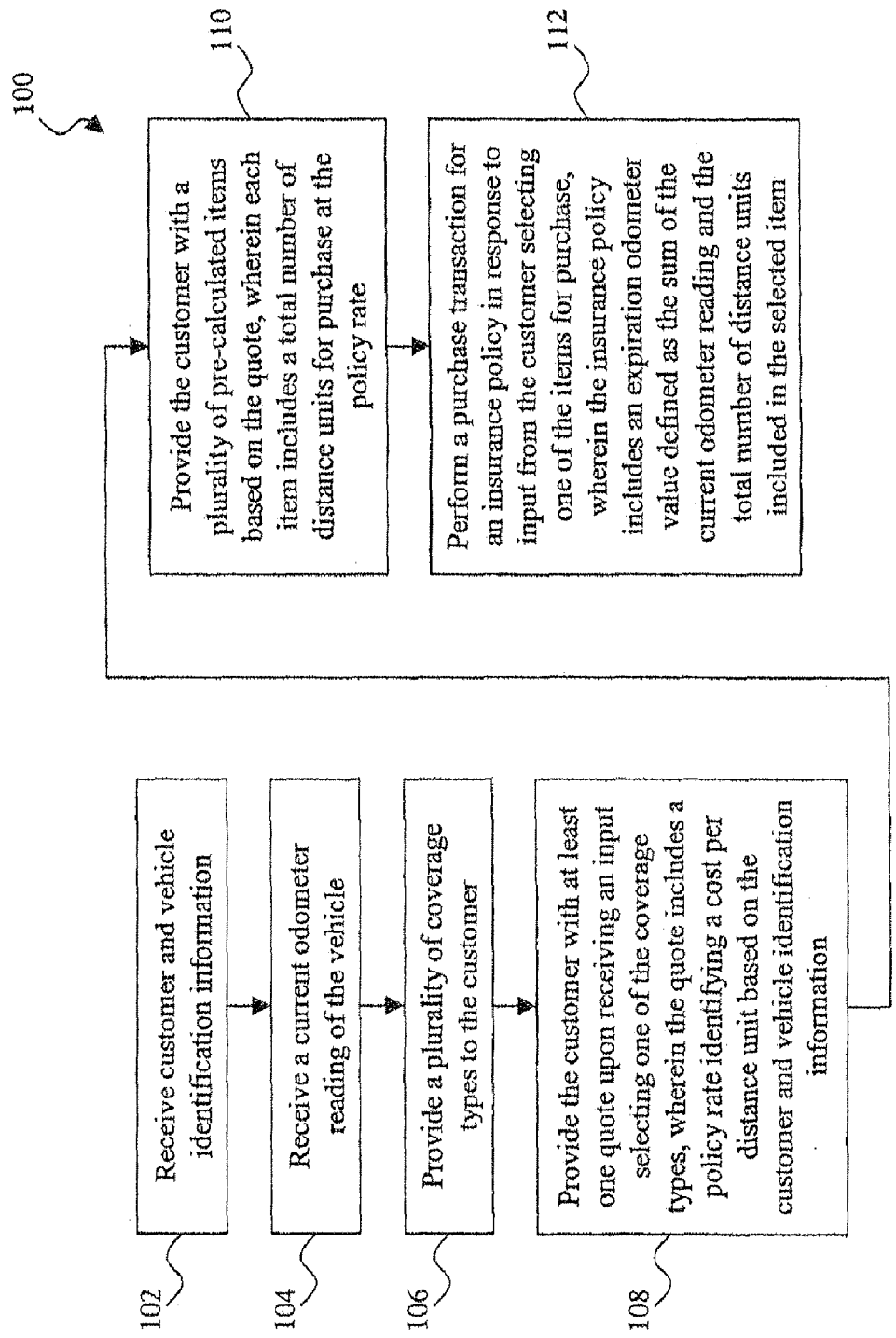
FIG. 1 is a flowchart of one embodiment of a method for assessing, pricing, and provisioning distance-based vehicle insurance.

The present disclosure relates to a system and method for the assessment, pricing, and provisioning of distance-based vehicle insurance. However, it is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a computer implemented method 100 may be used for providing distance-based insurance to a user (e.g., a customer). As will be described later in greater detail, the distance-based insurance enables variable use to be paired with variable pricing, in contrast to conventional term insurance, where a fixed cost is paired with variable usage. Accordingly, the method 100 enables distance-based insurance to be purchased and used like a utility, allowing costs to accurately reflect usage, eliminating inefficient pricing, and creating consumer choice.

Distance-based insurance may also improve the insurer's risk management by aligning consumer pricing with the best predictor of future insurance claims—vehicle mileage. Extensive research on the relationship between annual mileage and insurance claims suggest that if other risk factors (such as driver age, location, and vehicle use) are constant, then accident risk tends to increase in a roughly linear relationship with mileage. Distance-based insurance may encourage beneficial risk-pool selection by being most advantageous to low-mileage (and hence, lower risk) drivers.

Although accident risk tends to increase linearly with mileage, time constraints may still be taken into account from a practical standpoint. For example, it may not be ideal to have an insured purchase a large number of miles that could take years to expire from the policy. The rates currently being offered for various insurance products may also change depending on market forces and other events. An insurer may wish to more accurately account for exposure to risk that is more accurately considered time based (e.g., comprehensive and collision coverage) while providing a single policy to the consumer. To address this and other concerns, a time limit may also be imposed on a policy even though it is sold and priced as insurance per unit of distance. In such case, the insured would be provided insurance for a predetermined number of miles as described herein. However, an expiration date would also be placed on the policy. In this way, the coverage would expire the earlier of having driven all of the covered miles, or at the expiration date of the policy. As described further below, there may be a number of options for dealing with mileage that has not been used by the time the policy expires.

Referring again to FIG. 1, the method 100 begins by receiving customer and vehicle identification information in step 102. The customer identification information may include such information as driver's license number, age, gender, and address. The vehicle identification information may include such information as license plate number, vehicle identification number (VIN), and vehicle make, model, and year. In step 104, a current odometer reading of the vehicle is received. It is understood that the odometer units (e.g., miles or kilometers) may differ depending on such factors as the location of the vehicle or its origin. Furthermore, it is understood that no odometer audit or verification is performed by the insurance provider during the method 100, as shown in the present embodiment. The odometer reading entered by the customer is used as the current odometer reading.

While the customer-provided odometer reading is all that is needed in some embodiments to initiate or continue coverage, odometer readings from other information sources may be used for validation, verification, or for other purposes. Additional sources may include records from state inspections, records from titling or registration events, records from sale events, data from private databases, data from internal databases, and possibly other sources.

In step 106, multiple coverage types are provided to the customer. Exemplary coverage types may include recommended, economy, and minimal coverage. It is understood that some aspects of the coverage types may be controlled by applicable state regulations. In step 108, upon receiving an input selecting one of the coverage types, the customer is provided with at least one quote. The quote includes a policy rate identifying a cost per distance unit (e.g., $0.05/mile) based on the customer and vehicle identification information. Accordingly, the cost per mile includes various factors based on a risk assessment.

In step 110, the customer is provided with multiple pre-calculated items based on the quote. Each of the pre-calculated items includes a total number of distance units for purchase at the policy rate. For example, one item may provide 5000 miles of coverage for $250 (i.e., $0.05*5000), while another item may provide 6000 miles of coverage for $300 (i.e., $0.05*6000). It is understood that various alterations may be made in the calculations to provide, for example, an incentive for a customer to purchase additional miles. For example, the policy rate may be reduced to $0.049 upon the purchase of 10,000 miles. In step 112, a purchase transaction for an insurance policy may be performed in response to input from the customer selecting one of the items for purchase. The insurance policy includes an expiration odometer value defined as the sum of the current odometer reading and the total number of distance units included in the selected item. Accordingly, the method 100 enables a distance-based vehicle insurance policy to be purchased without a physical inspection of the odometer reading by the insurer prior to purchase, and without the use of odometer audits or verifications, or any type of tracking device placed in the vehicle.

While, in some embodiments, the methods of the present disclosure are meant to increase convenience to the customer by not requiring physical odometer inspections, audits, or tracking devices, this does not necessarily preclude the use of odometer readings from sources such as state inspections for purposes such as validation or verification. In one embodiment, the customer provided odometer reading may be checked for consistency against outside sources. For example, a customer-provided odometer reading for a given vehicle that is lower than an odometer reading obtained at a previous inspection or similar event would indicate that the customer has made a mistake, is attempting to defraud the insurance company, or has been the victim of odometer fraud. By verifying customer provided readings against outside sources, these problems may be appropriately addressed. In some embodiments a notice may be provided to the customer informing him or her of the discrepancy. Coverage may be cancelled if it is determined that the customer has purposefully misrepresented the odometer reading. In other cases, the customer may be alerted to odometer fraud and the decision may be made to extend or continue coverage. In another case, an odometer reading may be obtained from an outside source that would indicate that the customer's insurance policy has already lapsed. In this case, the customer may be notified and possibly given the opportunity to renew. As described herein, this additional data can be used to more accurately predict when a given customer is nearing a lapse in insurance coverage. In turn, more accurate warning notices of impending lapses in coverage may be generated.

Figure 2:
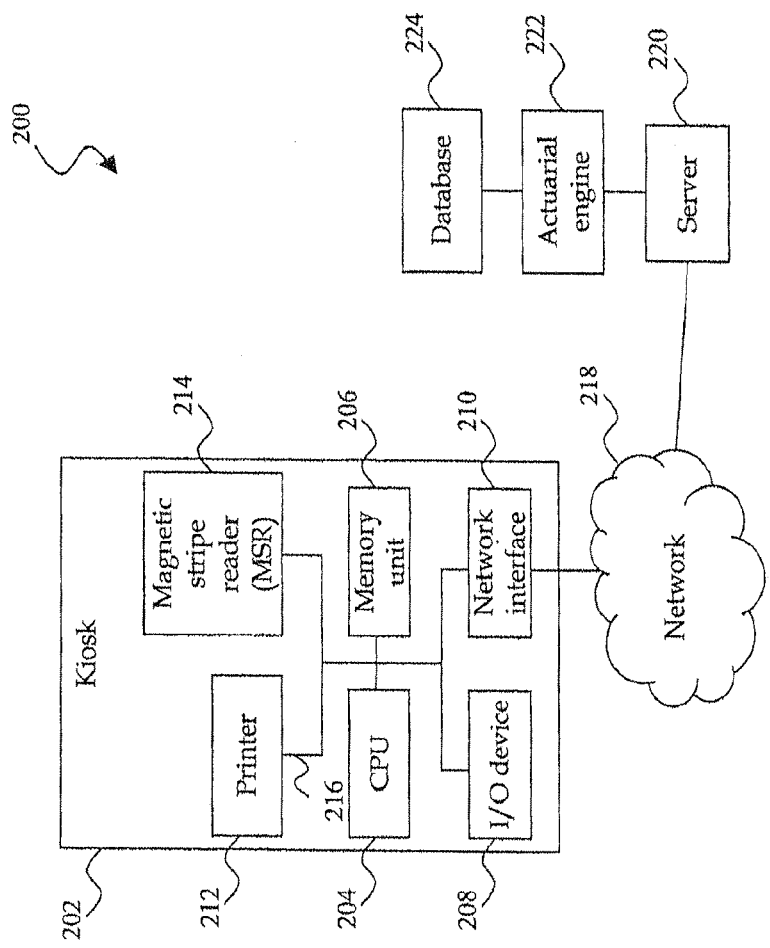
FIG. 2 is a diagram of one embodiment of a system within which the method of FIG. 1 may be implemented.

Referring to FIG. 2, a system 200 illustrates one embodiment of a system that may be used to provide distance-based vehicle insurance. For example, the method 100 of FIG. 1 may be implemented within the system 200. In the present example, the system 200 includes a kiosk 202 at which a user (not shown) may price, select, and purchase distance-based insurance. It is understood that other systems (e.g., a website) may provide similar functionality.

The kiosk 202 includes a number of components to provide information to the user and to receive and process input from the user. For example, the kiosk 202 may include a central processing unit (CPU) 204 coupled to a memory unit 206, an input/output ("I/O") device 208, a network interface 210, a printer 212, and a magnetic stripe reader (MSR) 214. The network interface may be, for example, a modem (e.g., a V.90 modem) and/or one or more network interface cards (NICs) that are each associated with a media access control (MAC) address. The network interface 210 may be compatible with any of a variety of wireline and wireless network technologies, such as TCP/IP and/or Bluetooth. The components 202, 204, 206, 208, 210, and 212 are interconnected by a bus system 216, which may include wireless and/or wired communication paths.

The components may be located in a single storage unit in the kiosk 202 or may be configured in many different ways. For example, the CPU 204, memory unit 206, I/O device 208, and network interface 210 may be located within the kiosk 202 as part of a single computer, and the printer 212 and MSR 214 may be attached as peripherals. In addition, it is understood that each of the listed components may actually represent several different components. For example, the CPU 204 may represent a multi-processor or a distributed processing system; the memory unit 206 may include different levels of cache memory, main memory, hard disks, and remote storage locations; and the I/O device 208 may include monitors, keyboards, touch screen displays, and the like. The printer 212 may be one or more printers and may utilize thermal printing or other suitable printing technologies. For example, the printer 212 may represent a thermal printer for vinyl stock and another thermal printer for coated paper stock.

The network interface 210 may be connected to a network 218. The network 218 may be, for example, a subnet of a local area network, a company wide intranet, and/or the Internet. Because the network interface 210 may be connected to the network 218, certain components may, at times, be shared with other computers (not shown). Therefore, a wide range of flexibility is anticipated in the configuration of the kiosk and its components. Furthermore, it is understood that, in some implementations, CPU 204 may act as a server to other computers.

Coupled to the kiosk 202 via the network 218 is a server 220. The server 220 may be one of a plurality of servers and may be selected for handling a particular user's request by a network device such as a router (not shown). The router may handle all communication requests by delegating them in round-robin fashion (or using another allocation/load balancing process) amongst the servers. The server 220 is coupled to or includes an actuarial engine 222, which utilizes information stored in a database 224. The actuarial engine 222 and database 224 may be used to determine an actuarial class for the customer as well as an associated price per mile, as will be described later. The server, which includes a processor and memory (not shown) may execute software instructions needed to access the actuarial engine 222 and database 224, as well as to communicate with the CPU 204. In some embodiments, the server 220 may host all or part of a website comprising various web pages and/or executable code for providing similar functionality to that of the present example.

The CPU 204 includes a plurality of software instructions for an operating system that handles peripheral device communication, network communication, and hosts a local point-of-sale (POS) application for customer use. The CPU 204 and its associated components may communicate all customer information and selections over the network 218 to the server 220, or the CPU 204 may perform some or all processing functions itself.

In operation, a customer interacts with the kiosk 202 via the touch screen display 208, which allows the customer to both read and enter data (the latter by use of an onscreen keyboard). When queried by the POS application for driver's license information, the customer swipes his driver's license in the MSR 214 (assuming the driver's license includes a magnetic stripe containing such information). When queried by the POS application for credit card information, the customer swipes his credit card in the MSR 214. If the customer agrees to a policy, the printer 212 prints a vinyl static-cling reminder sticker for the policyholder's windshield. Additionally, the printer 212 prints two proof-of-insurance cards on coated paper for the customer.

In some embodiments, the kiosk may include wireless (e.g., Bluetooth) capability to enable interaction with the customer's cellular telephone. For example, during a payment step in the purchasing process, the customer may elect to purchase the insurance via the cell phone. Cell phones have unique identifier numbers (e.g., an international mobile subscriber identify (IMSI) number) that allows for their cellular network identification. This number may also be used for unique identification for payment transactions. A customer may, for example, purchase insurance and have it added to their cell phone bill.

The use of a cell phone also enables a customer to transmit electronic coupon offers to the kiosk. These coupon offers could be part of a larger marketing campaign wherein the customer receives insurance coupons/credits at participating businesses.

The use of a cell phone may also enable the customer to conveniently transmit the phone number of a referrer (e.g., another customer who has referred the current customer for the current purchase). The phone number may then be used as a unique identifier (UID) for a referral credit. For example, the customer may scroll through their cell phone's address book looking for the name of the person who referred them to the kiosk 202. Next to each address entry may be a keypad option to select the phone registry entry as "Referred me for insurance." If the user presses the cell phone keypad item, the relevant phone number for the displayed address entry is transmitted to the kiosk 202. The kiosk 202 may be configured to acknowledge the receipt of the referrer number over the network.

Figure 3:
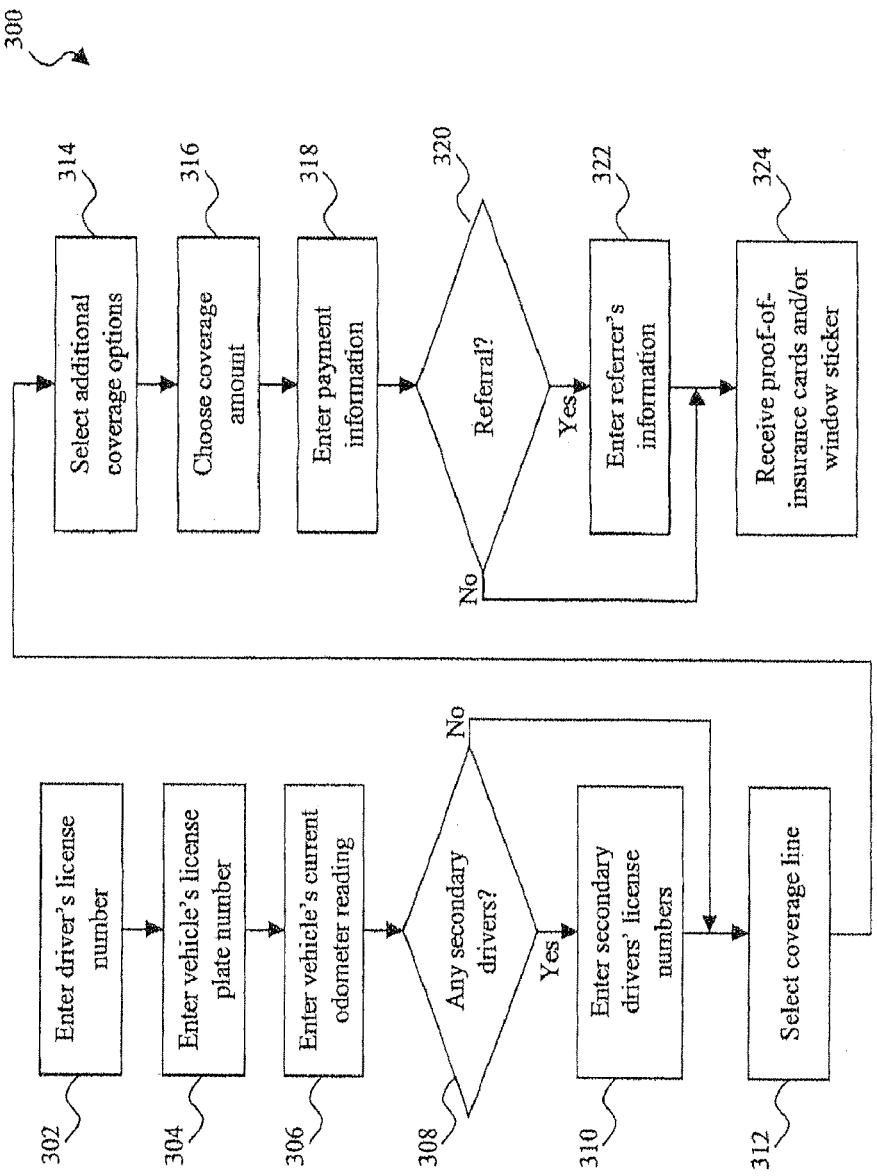
FIG. 3 is a flow chart of one embodiment of a method for using the system of FIG. 2.

Referring now to FIG. 3 and with additional reference to FIGS. 4-8, a method 300 illustrates a more detailed example of how a customer may purchase a distance-based vehicle insurance policy using an interactive system such as the system 200 of FIG. 2. In the present example, the customer is a new customer who was referred by an existing policyholder/customer.

Figure 4:
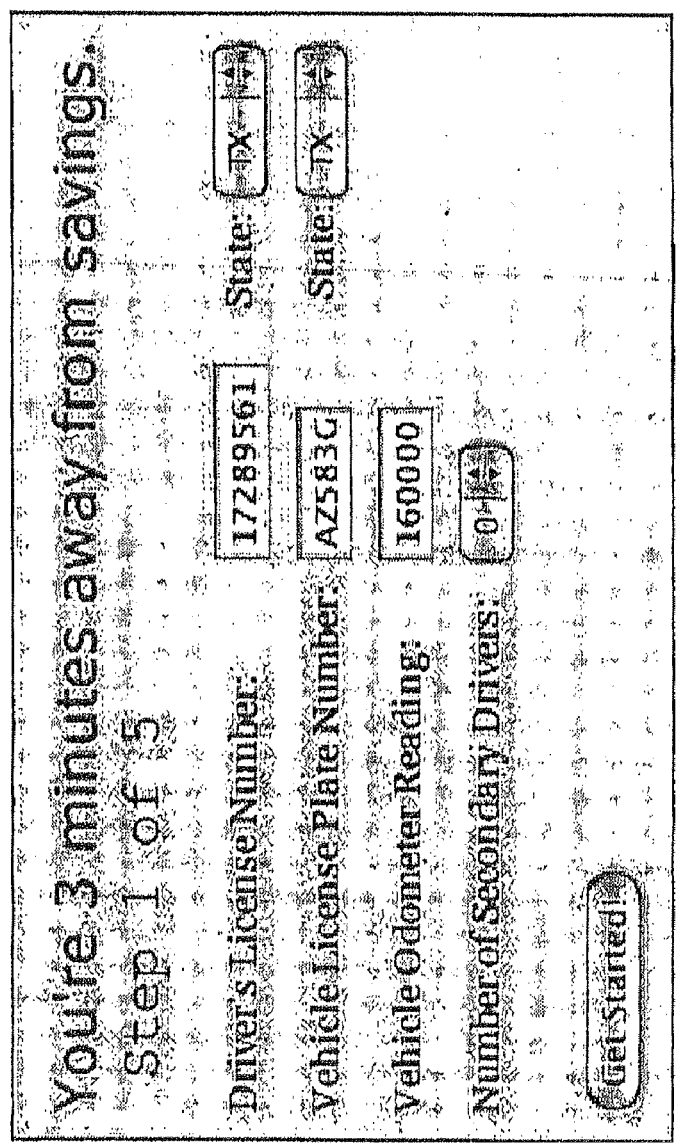

In step 302 and with additional reference to screenshot 400 of FIG. 4, the customer approaches the kiosk 202 and enters his or her driver's license by swiping it through the MSR 214 or entering the number via the touch screen 208. The system 200 may use the driver's license number to retrieve the customer's name, age, address, driving record, registered vehicles, and similar information. It may also be used for a limited criminal history check. If the consumer is a returning customer, all of the previous policy information may be loaded based upon the license number and a confirmation key, and the consumer may then modify any existing information and selections. In step 304, the customer enters the license plate number of the vehicle he wants to insure. The license plate number may be used to retrieve the vehicle identification number (VIN), vehicle make, vehicle model, vehicle color, and vehicle age. It may also be used to determine if differences exist between the driver's license information and vehicle registration information. The VIN may be used to check the vehicle history.

In step 306, the customer enters the current odometer reading of the vehicle, which provides the starting point for vehicle coverage (if a policy is purchased). In step 310, if there are secondary drivers (as determined in step 308), the customer enters the drivers' license numbers of the secondary drivers. As with the customer's driver's license number, this information may be used to retrieve the secondary drivers' names, ages, addresses, driving records, and registered vehicles, as well as for a limited criminal history check. In the present example, secondary drivers listed with a registered address different than the primary driver's (e.g., the customer) are not permitted.

In step 312 and with additional reference to screenshot 500 of FIG. 5, the customer chooses from three coverage lines (e.g., "Recommended," "Economy," and "Minimum") using a radio-button set. In the present example, the three coverage choices improve transaction speed and make the process more intuitive for the consumer, as well as simplifying the management of risk-pools. It is understood that more or fewer coverage choices may be used, and that each coverage choice may be more or less complicated. In step 314, the customer may also select from additional coverage options (e.g., "Collision," "Comprehensive," and "Roadside Assistance") using checkboxes as illustrated in FIG. 5. These are coverages that are not legally required, although some lienholders may require them to secure the vehicle collateral. For both the coverage lines and the coverage options, the cost per mile is illustrated to the customer. The cost-per mile is based on the entered customer and vehicle information and an actuarial rate class with which the customer is matched by computer (e.g., the server 220 of FIG. 2). The actuarial rate class is based solely on age, location (e.g., residence address or driving region), and vehicle type in the present example, but it is understood that other factors may be used.

Figure 6:
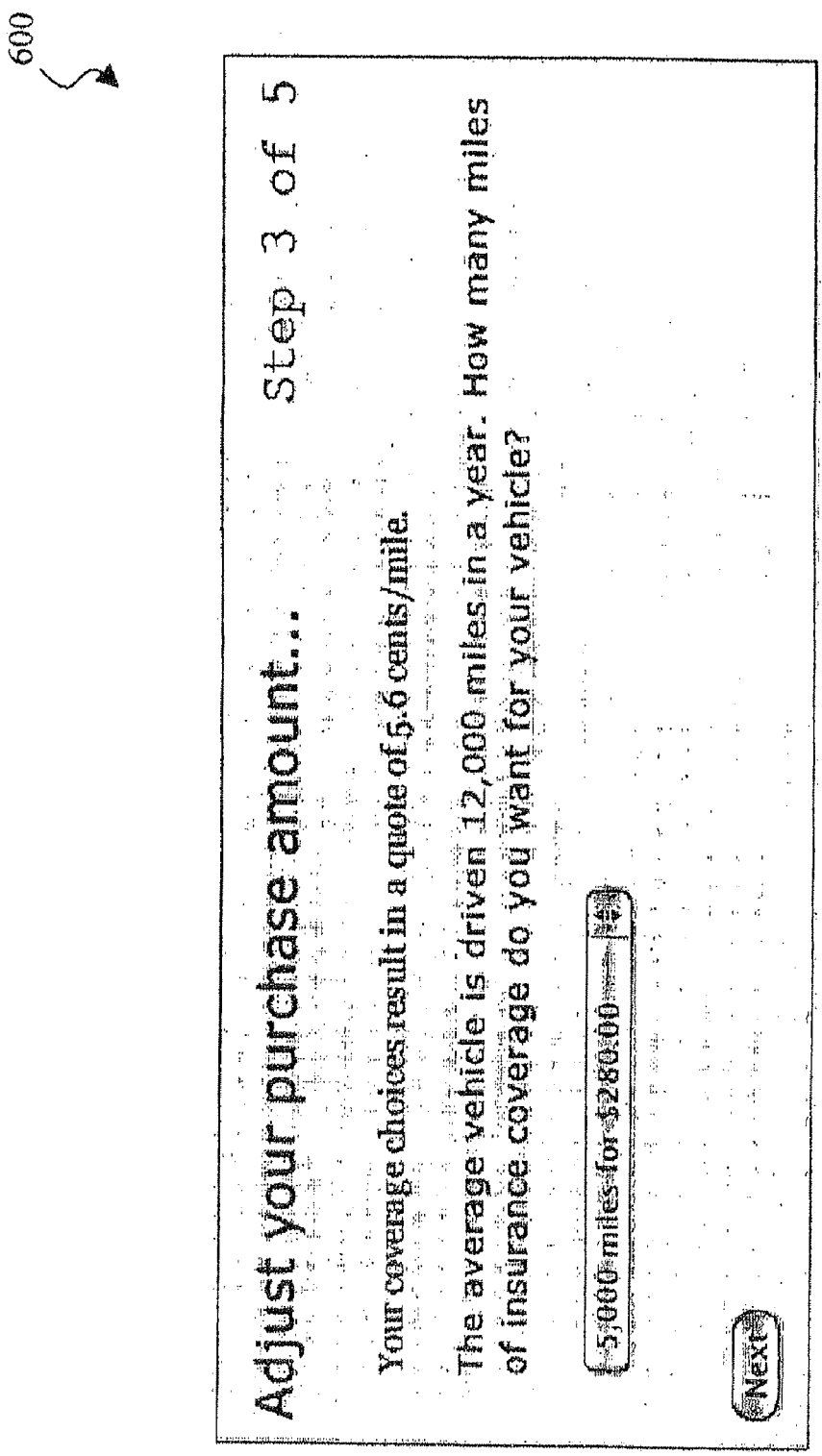

In step 316 and with additional reference to screenshot 600 of FIG. 6, the customer is presented with an insurance quote in the form <currency unit>/<distance unit>. In the present example, the quote is for $0.056/mile, which is the summation of the customer selected "Recommended" coverage line, and the additional coverage options "Collision" and "Comprehensive" (as priced in FIG. 5). The customer chooses the amount of insurance coverage by selecting from a list of pre-calculated items. For instance, the pre-calculated item in FIG. 6 offers $5000 miles of insurance for $280 (at $0.056/ mile). Additional menu items (not shown, but selectable using the up/down arrows in FIG. 6) may be provided for predefined increments up to a maximum available number of miles (e.g., 1000 mile increments up to 25000 miles). This approach allows consumers to see the cost savings relative to their term-based insurance plans. It also allows them to see a direct impact for reduced mileage in the future. The pre-calculation is also very convenient and intuitive as a user interface.

In step 318 and with additional reference to screenshot 700 of FIG. 7, the customer is presented with a electronic payment screen and may swipe his credit card in the MSR 214 or enter the credit card information via the touch screen 208. This approach provides not only payment information, but also provides a last validation check for corroboration of the address/name information from the driver's license or provided by the customer with the credit card issuer's records. Assuming a successful validation, immediate payment may be received from the customer without having to incur the clearance/handling costs of cash or personal checks.

It is understood that not every customer utilizing the systems and methods disclosed herein will qualify for insurance coverage. For example, those who have been found to have driven under the influence of alcohol or while intoxicated may not qualify for coverage. In some embodiments, drivers under 18, drivers without a car, drivers who do not live and/or work in a specified state, drivers without licenses or with expired licenses, drivers with adverse prior claims history, and drivers utilizing their cars for business may also be disqualified. Those skilled in the art will also recognize other risk factors, circumstances, and legal considerations that may disqualify a driver from obtaining coverage utilizing the systems and methods disclosed herein.

Similarly, some circumstances may lead an insurer utilizing the systems and methods of the present disclosure to require a live representative or agent to evaluate particular cases. These cases may fall outside the ambit of the automated systems and methods disclosed herein, but insurance may ultimately be provided following review. In such cases, the information obtained by the automated systems and methods disclosed herein may be used for the evaluation. In other embodiments, the information obtained may be supplemented or replaced by additional information obtained by the live representative or agent. If insurance coverage is granted for such exceptional cases, the customer may be required to continue to deal with the live agent or may be returned to the automated systems and methods described herein.

Referring again to FIG. 3, in step 320, a determination may be made as to whether the customer was referred by an existing customer. If so, in step 322, the customer enters a referral UID of the referring customer. The referral UID is used to calculate the credit to the referrer, as will be described later in greater detail.

In step 324 and with additional reference to FIG. 8, the customer completes the financial transaction. Using the printer 212, two proof-of-insurance receipts are printed on paper cardstock. The proof-of-insurance cards may also have a confirmation key which can be used to speed future transactions by loading existing policy data. Another printer may be used to print a static-cling windshield reminder sticker (FIG. 11) on vinyl stock simultaneously with the printing of the proof-of-insurance cards, or the first printer may print the reminder sticker after printing the proof-of-insurance cards. The customer may then collect the printed items and end the session with the kiosk 202.

Figure 9:
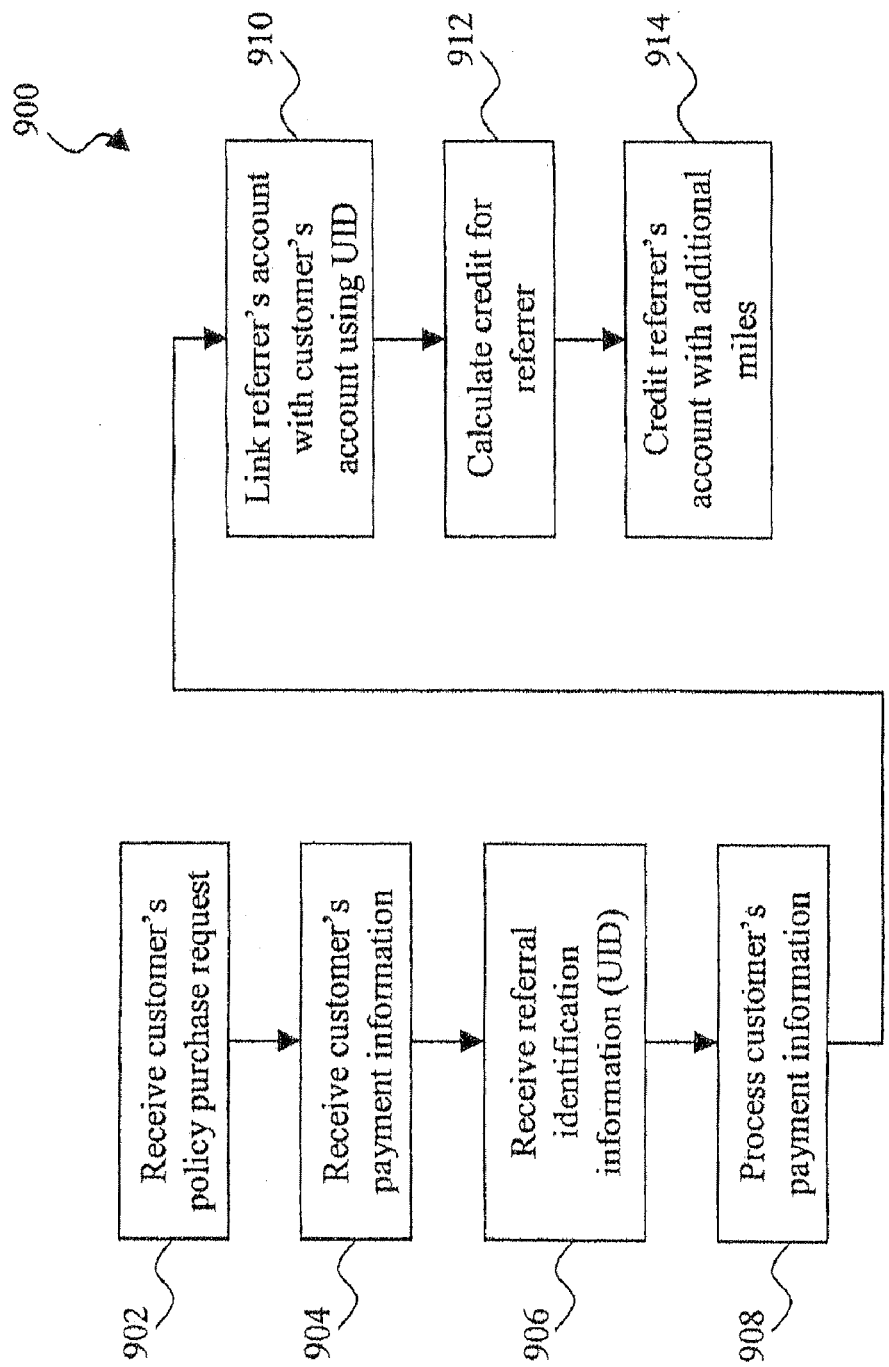
FIG. 9 is a flowchart of one embodiment of a method for calculating and applying a credit for a referral.

Referring now to FIG. 9, in another embodiment, a method 900 may be used to calculate a credit (e.g., additional miles) for an existing customer (a referrer) who refers a new customer and credit the referrer's account with the calculated amount. In steps 902 and 904, a customer's policy purchase request and payment information are received as described previously in greater detail with respect to FIG. 3. In step 906, the UID of the referrer is received and, in step 908, the new customer's payment is processed. In step 910, the referrer's UID is used to link the referrer's account with the new customer's account.

In step 912, the credit that is to be added to the referrer's account is calculated. In the present example, the credit is a distance-denominated credit that provides additional miles of insurance coverage on the referrer's existing policy. The credit may be calculated using a formula such as: Number of Miles Credited to Referrer's Policy=((A Percentage)*(Dollar value of new customer purchase))/(Referrer's premium per mile). For example, with a percentage of 0.02, a dollar value of $280 for the new customer's purchase, and a premium per mile of $0.05 for the referrer, the credit to the referrer's account will be 112 miles. In the present embodiment, the credited amount is not redeemable for cash and only new, first-time customer purchases will qualify towards a referral credit. An existing customer, by referring multiple new customers for first-time purchases, may receive multiple, cumulative credits. In step 914, the referrer's account is credited with the calculated amount of miles. In some embodiments, the credit may be "reserved" for a previous customer that no longer has a current policy. If the referrer once again obtains a current policy, the credit may be applied to the account. This may be used, for example, to both encourage referrals and to encourage a previous customer to purchase another policy.

Figure 10:
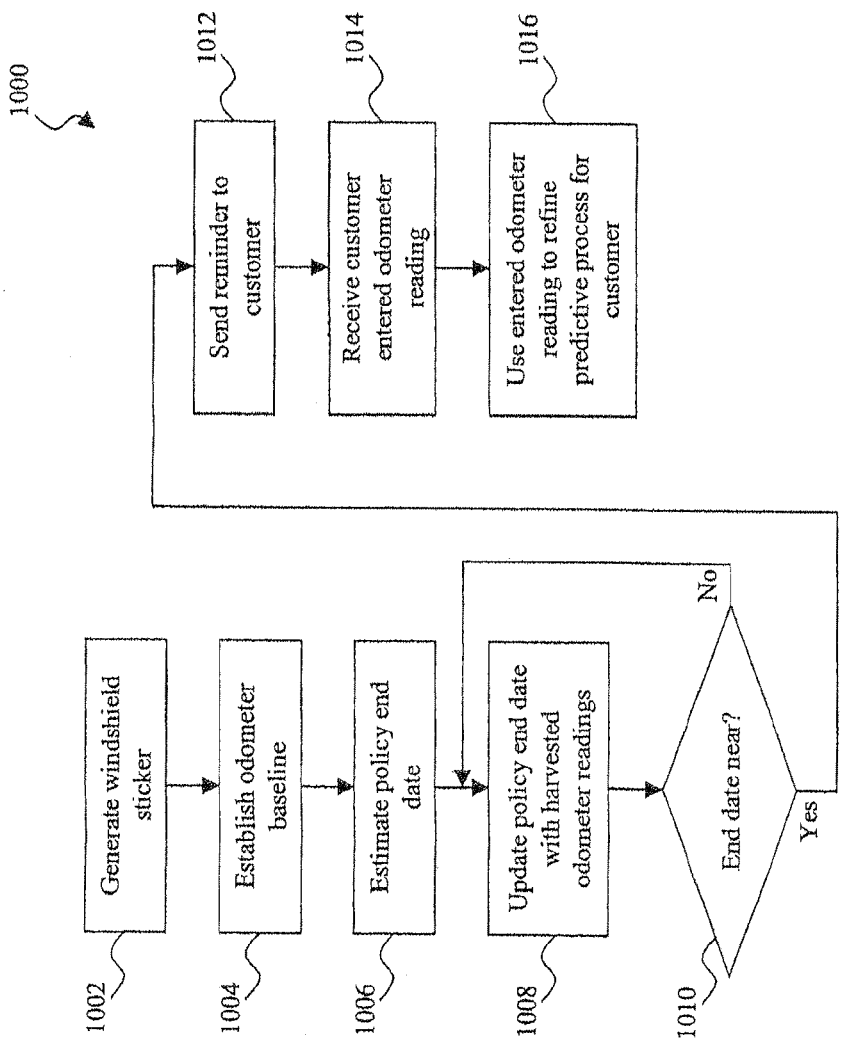
FIG. 10 is a flowchart of one embodiment of a method for determining whether an insurance policy is about to expire and notifying the customer of the upcoming expiration.

Referring now to FIG. 10, a method 1000 illustrates one embodiment of a process for generating policy expiration/renewal reminders. The method 1000 includes the use of collected odometer readings, pricing multipliers, interactive reminders, and static-cling windshield stickers. It is understood that not all of these approaches may be used and that others may be added.

In some embodiments, the purchase of distance-based insurance creates a contract that is limited to a quantity of distance (e.g., "from the odometer reading 5000 miles up to and including the odometer reading 7500 miles"). Accordingly, it may be desirable to remind policyholders of approaching policy lapses to prevent them from accidentally driving beyond their policy coverage. Additionally, many consumers purchase a vehicle with the assistance of a lien, and the lienholder often requires insurance coverage of the vehicle to protect the collateral for the lien.

Figure 11:
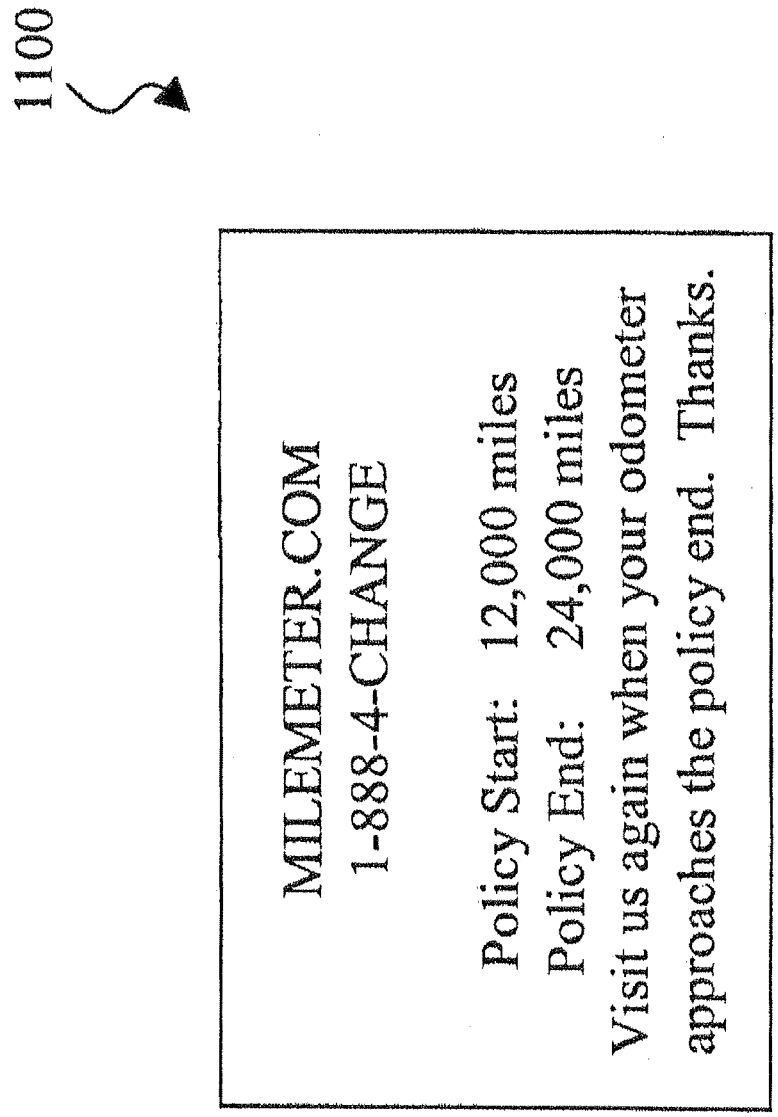
FIG. 11 is an exemplary windshield sticker that may be generated by the method of FIG. 10.

In step 1002 and with additional reference to FIG. 11, a static-cling windshield sticker 1100 may be generated when a customer purchases a distance-based insurance policy (as in step 324 of FIG. 3). As illustrated in FIG. 11, the sticker may include such information as the beginning and ending odometer readings of the insured vehicle, as well as a phone number at which information regarding renewal may be obtained.

In addition to, or instead of the window sticker, the customer may be sent reminders based upon, for example, estimated distance traveled as follows. In step 1004, a baseline is established by the customer's starting odometer reading at the time of purchase. In step 1006, the policy end date is estimated using the customer's average vehicle distance traveled (e.g., miles) for a given unit of time. For example, if a policy is for 12000 miles and the average driver travels 1000 miles per month, the estimated policy lapse date is twelve months from the date the policy was purchased. The estimated rate may also be calculated using the ownership records. For example, if the vehicle was purchased by the policyholder two years ago with an odometer reading of 30000 miles and the current odometer reading is 78000 miles, then the policyholder travels approximately 2000 miles per month. In the absence of a more accurate rate, a default rate may be applied.

In step 1008, the estimated lapse date is updated with any harvested odometer readings, which may come from such sources as vehicle emissions tests, vehicle maintenance, vehicle sales, vehicle purchases, vehicle registrations, and vehicle accident reports. Any odometer readings that are harvested enable a more accurate travel rate to be estimated for the particular customer.

In step 1012, if the policy end date is near (as determined in step 1010), the customer is sent a reminder (e.g., a letter or an electronic reminder such as an email or text message) of impending lapse of the policy (e.g., as defined either by time or by mileage). This reminder directs the customer to use a communications device (e.g., a cell phone, pager, or personal digital assistant) or to go to a website, kiosk, or other interactive destination in order to enter their current odometer reading. The entered odometer reading may be used in step 1014 to further refine the predictive process for the rate of vehicle travel and the associated lapse date. Over a period of time, the method 1000 provides a more personalized rate of travel for each policyholder. With fewer odometer readings, the notice may be sent with a greater margin for error (e.g., more time until the policy lapse). With more odometer readings and the corresponding fidelity, the notice may be sent with a smaller margin of error (e.g., less time until the policy lapse).

Figure 12:
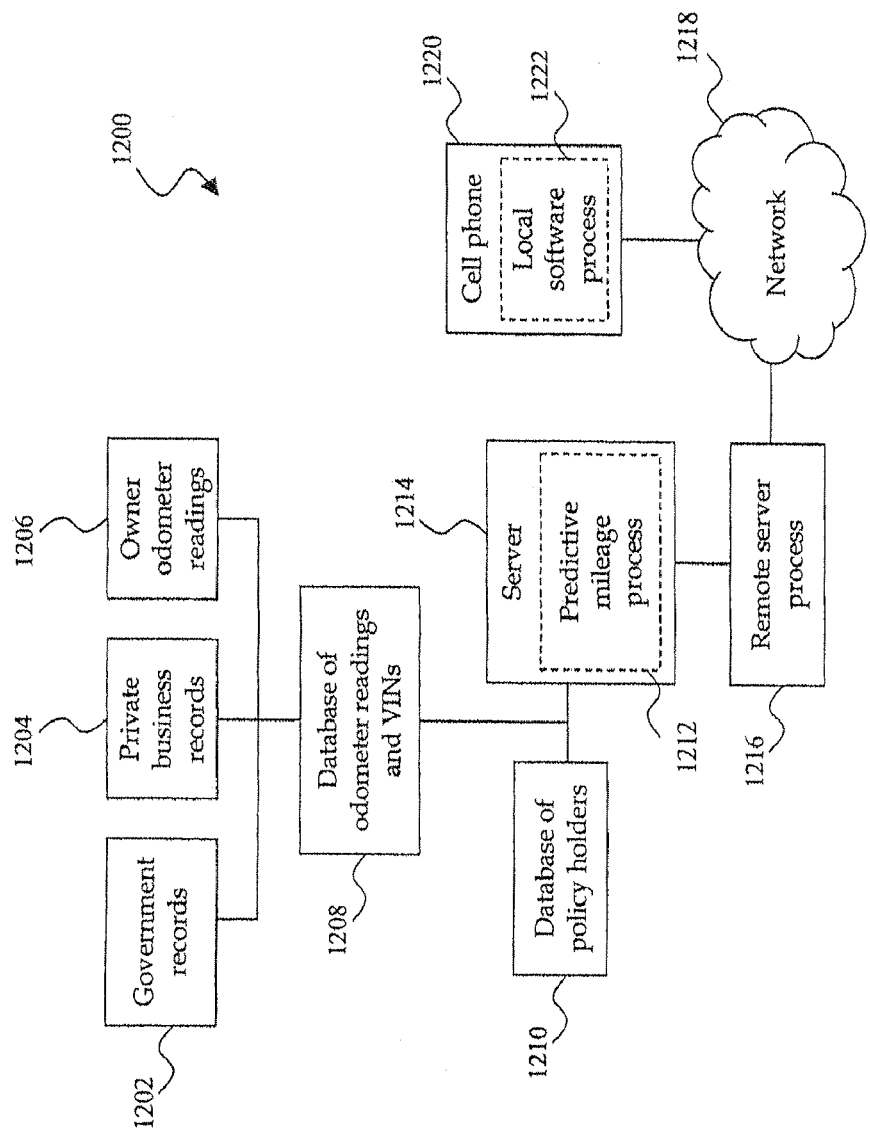
FIG. 12 is a diagram of one embodiment of a system within which the method of FIG. 10 may be implemented.

Referring to FIG. 12, a system 1200 illustrates one embodiment of a system implementation for sending electronic reminders to a customer via a cell phone. Various databases and record readings from government sources 1202 (e.g., state records and national government sources), private business records 1204, and the owners' reported odometer readings 1206 are amalgamated into a central data repository 1208 using vehicle identification numbers (VINs) as the primary keys. Additionally, each recorded odometer reading is associated with a date. A database 1210 of policyholders, including their associated vehicles, is linked to the database 1208 of odometer readings.

A server software process 1212 (e.g., software instructions representing a process for estimating mileage to predict policy lapses) operating on a server 1214 analyzes all odometer readings associated with a policyholder's vehicle. When the process 1212 identifies an approaching policy expiration, it spawns a remote server process 1216 to communicate with a policyholder. In the present example, the remote server process 1216 sends a message to the policyholder's cell phone 1220 over a standard cellular network 1218.

The policyholder's cell phone 1220 receives the message, which is interpreted by a local software process 1222 (that may have been previously installed by the policyholder). The cell phone then presents a screen querying the policyholder and requesting that the policyholder enter his vehicle's current odometer reading using the phone keypad. When the policyholder enters the odometer reading, the local software process 1222 either recommends an immediate insurance renewal or recommends waiting.

If the local software process 1222 recommends a renewal, the local software process opens a screen to purchase additional miles of insurance coverage. The policyholder selects the quantity and the method of purchase (e.g., via a credit card on file, or via cell phone bill). If the local software process 1222 recommends waiting, the local software process sends the odometer reading to the remote software process 1216, which then passes the information on in order to update the databases. In some embodiments, the local software process 1222 may not query the policyholder if the recommendation is to wait. Furthermore, in some embodiments, the local software process 1222 may simply repeat a recommendation made by the remote software process 1216.

It is understood that the system 1220 may be coupled to or part of other systems, such as the system 200 of FIG. 2. For example, the server 1214 may be the server 220 of FIG. 2, or may be in communication with the server 220.

Figure 13:
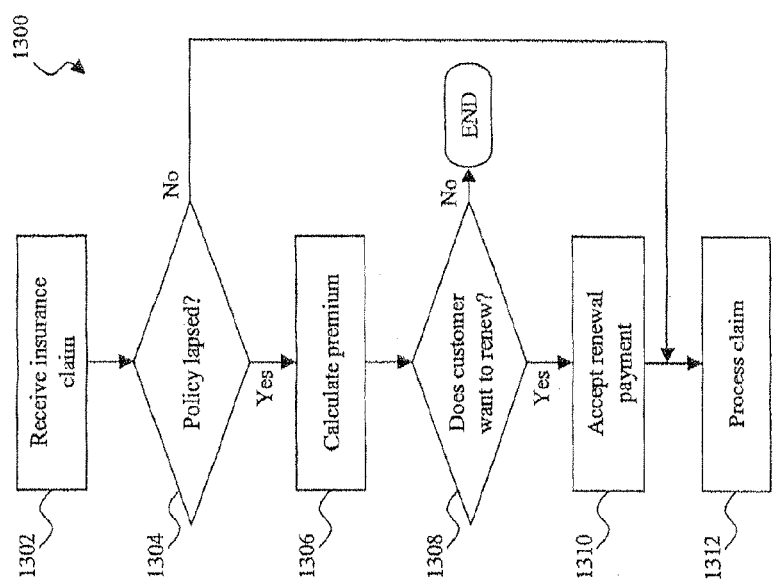
FIG. 13 is a flowchart of one embodiment of a method for calculating a premium for use in processing a claim based on an expired insurance policy.

Referring now to FIG. 13, in another embodiment, a method 1300 may enable a policyholder to renew an expired policy by retroactively pricing the coverage exposure from the point of policy lapse to the point of a vehicle claim. Generally, there are three parties concerned with possible coverage lapses: state regulators, policyholders, and lienholders. Regulators need policyholders to maintain coverage to meet legal requirements. Lienholders need coverage to maintain protection of their collateral (the vehicle). Policyholders need to maintain coverage to comply with the law, possible lienholders, and to minimize potential financial losses.

One problem of distance-based insurance is that policyholders can drive beyond the odometer limit of their vehicle's coverage, causing their policy to expire. The method 1300 may be used to address the likely usage patterns of policyholders (as lapses will happen) and balance the uninterrupted coverage needs of regulators, lienholders, and policyholders without burdening the insurance product itself with financial or operational baggage.

In step 1302, an insurance claim is received from a policyholder. In step 1304, a determination is made as to whether the policy against which the claim is being made has lapsed. For example, an odometer reading included in the claim may be compared to an expiration odometer value of the policy. If the policy has not lapsed, the method continues to step 1312, where the claim is processed.

If the policy has lapsed, the method continues to step 1306, where a premium is calculated. While the policyholder is explicitly covered for any claims/involvements that occur beyond the stated odometer limit of their policy, the policyholder will be charged a financial premium if the associated insurance policy is beyond the stated odometer limit. Among other benefits, this premium encourages the policyholder to keep their policy current by aligning their financial interests with their risk interests.

The premium may be calculated as: Premium=((Current odometer reading)-(Odometer limit for policy expiration))* ((Policy rate)*(Multiplier)). "Premium" is the price the policyholder will be charged for the period of vehicle use between the expiration of their policy and the odometer reading at the time of the involvement/claim, "Current odometer reading" is the current reading of the vehicle's odometer. "Odometer limit for policy expiration" is the upper limit for the policy coverage (e.g., if the policyholder purchased 5,000 miles of coverage with a starting odometer reading of 90,000 miles, then the policy expires at 95,000 miles). "Policy rate" is the regular cost of coverage to the policyholder for the given vehicle and coverage selections (e.g., $0.05/mile). "Multiplier" is a number that indicates how much the premium will be over the normal rate.

Accordingly, if a claim is made on a lapsed policy, the premium will be charged for the usage during the lapse. For instance, if a policyholder's policy ends at 95,000 miles and the policyholder has an involvement at 100,000 miles, the policyholder may still elect to make a claim. If a claim is made, he must pay for the implicit insurance consumed from 95,000 miles to 100,000 miles, a total of 5,000 miles. These 5,000 miles of coverage will cost him a multiple of his usual rate. For instance, if his usual rate is $0.05/mile, he must pay $0.25/mile (with a multiplier of five). Therefore, he must pay $1,250 (instead of the $250 cost at the usual rate).

In step 1308, a determination is made as to whether the policyholder wants to renew the policy. The premium may be displayed to the policyholder at this time or, in other embodiments, the policyholder may simply be given the choice of renewal and notified that a premium will be charged per a defined policy that is provided to the policyholder. If the policyholder does not want to renew the policy, the method 1300 ends. If the policyholder does want to renew the policy, payment from the policyholder may be accepted in step 1310 and the claim may be processed in step 1312. Accordingly, the method 1300 may provide "retroactive coverage" for distance-based insurance to be maintained at all times. Furthermore, the premium may encourage policyholders to keep their policies current through renewal, extension, or larger initial purchases.

In another embodiment, no grace period or retroactive coverage will be provided. In such an embodiment, if a customer has exceeded the mileage or time limit of his or her policy, he or she will be denied coverage for any claims submitted for events occurring after the lapse. As will be more fully described below, in some cases, policies will expire at the earlier of a predetermined time or exceeding the mileage limit of the policy.

Regardless of whether a particular policy has a time-based expiration, credit for unused mileage may be available for renewing a policy before expiration. In one embodiment, the number of miles of coverage available on a policy will be added to the renewal policy. The price of the new policy is not reduced in this embodiment, although other methods are possible. A customer may effectively lower his or her cost on the new policy by simply buying fewer miles at renewal. Over time, the customer, as well as the present system will be able to more accurately predict the actual number of miles needed over a given period of time. It may also be possible to differentiate between the number of miles needed during a given time of year. For example, a particular driver may use more miles during the summer or winter months. This information can be taken into account for purposes of renewing policies, adding miles, or generating reminder notices.

In addition to cases where a customer may wish to renew or add miles before the end of a term (or before all purchased miles are utilized), unused mileage may also be rolled over to a new policy in the event of a total loss of the covered vehicle. Similarly, miles may be creditable on a new policy if the covered vehicle is sold or traded. In some embodiments, refunds for unused miles will not be issued unless the policy is canceled by the insurer. In other embodiments, other arrangements are possible, including refunding at full price or a reduced price per mile.

In cases where unused or unearned miles are transferred to a new policy, there may be a difference between the cost per mile for the miles of coverage previously purchased and the cost per mile for the new transaction. This could be due to re-rating based on a change in residence, excessive claims, moving violations, additional drivers on the policy, or for other reasons. In cases such as these, the buyer may be required to pay the difference between the old and the new rate for the unused miles in order to roll them to a new or renewal policy. In some cases, the insurer may require that the unused miles be rolled to the new policy rather than letting the insured purchase new miles and disregard the old unused ones.

In one embodiment, when miles are purchased they will not be re-rated unless the miles are both unused and unexpired. The miles may become used by having driven them and they may become expired upon the expiration date of the policy. In the event that a new policy is written before the miles are used or expired, the unused miles may be re-rated and re-underwritten as part of the purchase process. The consumer may then receive the benefit of having a new expiration date associated with any of the unused miles.

Referring now to FIGS. 14 and 15, in other embodiments, it is understood that variations of a distance-based insurance policy may be used. For example, three possible distance-based policy contract types include a pure distance-based policy, a hybrid policy, and an adjusted term policy. The pure distance-based policy (a portion of which is shown in FIG. 14) bases the policy beginning and ending solely on odometer readings. The policy is only valid while the vehicle's odometer reading is within the stated value range. The hybrid policy type combines term-based comprehensive coverage with distance-based liability/collision coverage. The comprehensive portion is delimited by two dates to create a term policy. The liability/collision portion is delimited by two odometer readings to create a distance policy. The adjusted term policy type (a portion of which is shown in FIG. 15) provides for a term with annual credits/debits for actual usage (e.g., based on mileage). The credit/debit is based upon the harvested odometer readings. If the customer is under the stated mileage at the end of the term, he will receive a credit for the unused miles at the policy rate. If the customer is over the mileage, he will pay a debit for the overage at the policy rate.

It is understood that, while the above embodiments do not rely on odometer audits or verification, various steps may be implemented to protect against fraud using, for example, candidate screening at the time of purchase, odometer record audits at the time of a claim, and/or national claim screening at the time of a claim. Some or all of these approaches may be implemented in the examples described above, including the system 200.

Using candidate screening at the time of purchase (e.g., driver's license number, license plate number, and credit card), an insurance company may gather many pieces of corroborating information regarding an applicant for a policy. By cross-checking information with vehicle registration and ownership records, criminal records, registered addresses, claims databases, etc., discrepancies or other "flags" may be identified that may prevent a policy from issuing to a customer. In some embodiments, such a flag may result in a request for the potential customer to contact the insurance company, or may result in a notification to the insurance company that customer support should contact the potential customer.

Using odometer record audits at the time of a claim may include checks with public and private databases (vehicle registration, emission inspections, oil services, owner statements, etc.). For example, if the involved vehicle has been in an accident, the reporting police officer will provide an odometer reading; if the involved vehicle is sent to a repair shop, the latter will provide an odometer reading. A suspect odometer history may result in a claim being denied or investigated.

National claim screening at the time of a claim may be used in place of or in addition to candidate/claim screening at the point-of-sale. For example, an insurance company may screen all claim requests against fraud discovery and prevention database services from companies providing such information.

Figures 23, 24:
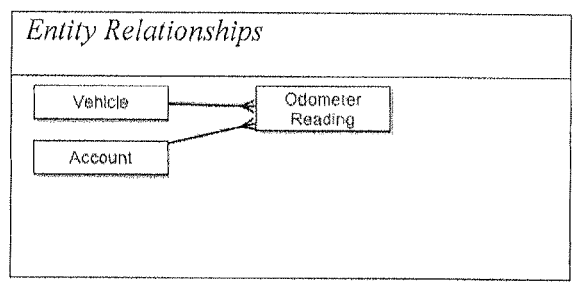
FIG. 23 is an entity relationship diagram illustrating one embodiment of a system for storing odometer data.
FIG. 24 is an exemplary screenshot corresponding to a system functionality allowing a customer to enter a voluntary odometer reading.

Referring now to FIG. 23, an entity relationship diagram illustrating one embodiment of a system for storing odometer data is shown. The diagram of FIG. 23 also corresponds to a method for implementing the differentiation of various odometer readings from various sources as described above. Although other embodiments may feature differing implementations, it can be seen in FIG. 23 that many odometer readings may be taken and stored for each vehicle and/or account. This data may be stored in one or more electronic databases that form a part of the system of FIG. 2, for example.

In one embodiment, a record associated with an odometer reading will provide a unique identifier to the transaction or reading. A reference to the vehicle corresponding to the reading, a reference to an associated account, the mileage or other distance recorded, a time stamp, and a source or trust level may also form a part of the record.

As has been described, odometer readings may come from a plurality of sources. The odometer readings from one source may be more trustworthy than from another. For example, an odometer reading from an official state inspection may be more trustworthy that one provided by the customer. In one embodiment, each odometer reading will therefore be associated with a level of trust. This trust level could also be associated or recorded with the odometer reading record described above.

In one embodiment, odometer readings may be identified primarily as trusted or untrusted. The type of trusted or untrusted reading could also be determined and/or stored. For example, a reading provided by a customer for a policy quote may be labeled as "untrusted-quote." A reading for a cancellation could be labeled "untrusted-cancellation." An "untrusted-trade-in" may be associated with a reading provided by a customer who has traded in his or her car.

In will be appreciated that many types of readings will be untrusted readings, at least initially. Issuing a policy or setting policy terms, issuing refunds, and paying claims are example of activities that may require a trusted odometer reading. It may also be possible for certain types of untrusted readings to become trusted readings. For example, an "untrusted-quote" reading may become a "trusted-purchase" reading when a policy is issued. At this point, there may be some safeguards associated with upgrading the "untrusted-quote" reading to trusted status. For example, the consumer will have entered into a legally binding insurance contract attesting that the reading provided is accurate. Other types of trusted readings could include "trusted-voluntary" readings, that will be described in greater detail below, and "trusted-verified-database" readings.

The "trusted-verified-database" reading is a reading that has been verified by a trusted database, or possibly a trusted individual. For example, a department of motor vehicles (DMV) database indicating a vehicle mileage at trade or sale may provide a trusted reading. In the event a claim is made on a policy, a claims adjuster could also make a trusted reading that could become the basis for paying out a claim.

It can be seen from the present disclosure that mileage-based insurance policies may be implemented without resort to any in-vehicle monitoring device. In the event that a consumer would receive a financial benefit from falsifying odometer information, a verified reading may be required. For example, when vehicles are traded in or policies are cancelled (corresponding the "untrusted trade-in" and "untrusted-cancellation" readings, respectively) the customer would stand to gain financially from underreporting vehicle mileage. By requiring trusted readings before refunds are issued or claims are paid, the insurer may be protected from fraud issuing insurance policies on a per-mileage basis. Trusted readings, in most cases, are tied to legal documents, warranties, or financial consideration.

Any odometer reading may be subject to validation before it may be entered or stored in any database or utilized by an insurance provider. When an odometer reading is entered, it may be checked to insure that it is a positive number, or checked to make sure that the range of the number entered is reasonable. For example, a brand new car would be likely to have a low mileage, while a 5 year old car with less than 10,000 miles would be unusual. In some instances, an odometer reading failing validation could be overridden by a human operator.

An odometer reading may be associated with a vehicle identification number (VIN) and/or a policy number. Any supplied odometer reading may be further validated by checking against internal and/or external databases to ensure the reading is reasonable. For example, an odometer reading may not be used that is lower than a reading already reported or recorded by the DMV. Additionally, a customer may not supply an odometer reading for a vehicle for which they have previously reported a higher reading. Checks may also be performed against commercial or third party databases providing vehicle history and mileage information.

Referring now to FIG. 24, an exemplary screenshot corresponding to a system functionality allowing a customer to enter a voluntary odometer reading is shown. This could be implemented, for example, by the system of FIG. 2, or another suitable system. In the screenshot of FIG. 24, a customer is allowed to provide a voluntary odometer reading. The reading obtained in this manner may be denoted as "trusted-voluntary." In one embodiment, the "trusted-voluntary" reading is provided by an existing customer to track the mileage of a vehicle currently insured according the systems and methods of the present disclosure.

The "trusted-voluntary" reading may be subject to validation as described above. Although the reading is voluntary, and provided by the customer alone, it may be referred to as trusted because the insurer may not use this reading as the basis of any financial transaction for which the customer would have an incentive to underreport mileage. For example, the "trusted-voluntary" reading may be used to generate reminder notices when the customer is nearing the expiration of a policy. In some embodiments, the number of voluntary readings provided by a customer may be limited (e.g., no more than one per 24 hours).

The "trusted-voluntary" reading could also be used to more accurately predict the number of miles a customer may need to purchase at renewal. As more odometer readings are gathered, the insurer may also be able to predict seasonal variations in the number of miles needed by a particular customer. For example, a given customer may use more miles in the summer months. This information could be supplied back to the customer at renewal time in order to allow the customer to make a more informed decision regarding the next insurance purchase.

It will be appreciated that the "trusted-voluntary" readings may find other uses within the context of the present disclosure. For example, "trusted-voluntary" readings could be used to track the number of miles of earned premium on a given policy. Fraud detection is another application. For example, one or more "trusted-voluntary" readings below a verified reading from an outside source could indicate that the customer is purposefully underreporting mileage. As described, the "trusted-voluntary" reading may not be used as the basis for a refund or claim settlement. Incorrect "trusted-voluntary" reading could, however, indicate to the insurer that a customer may not be dealing honestly. In order to increase the utility of the "trusted-voluntary" reading, such a reading could be required each time a customer utilizes the system of FIG. 2, or a similar one, to service his or her account.

Figure 16:
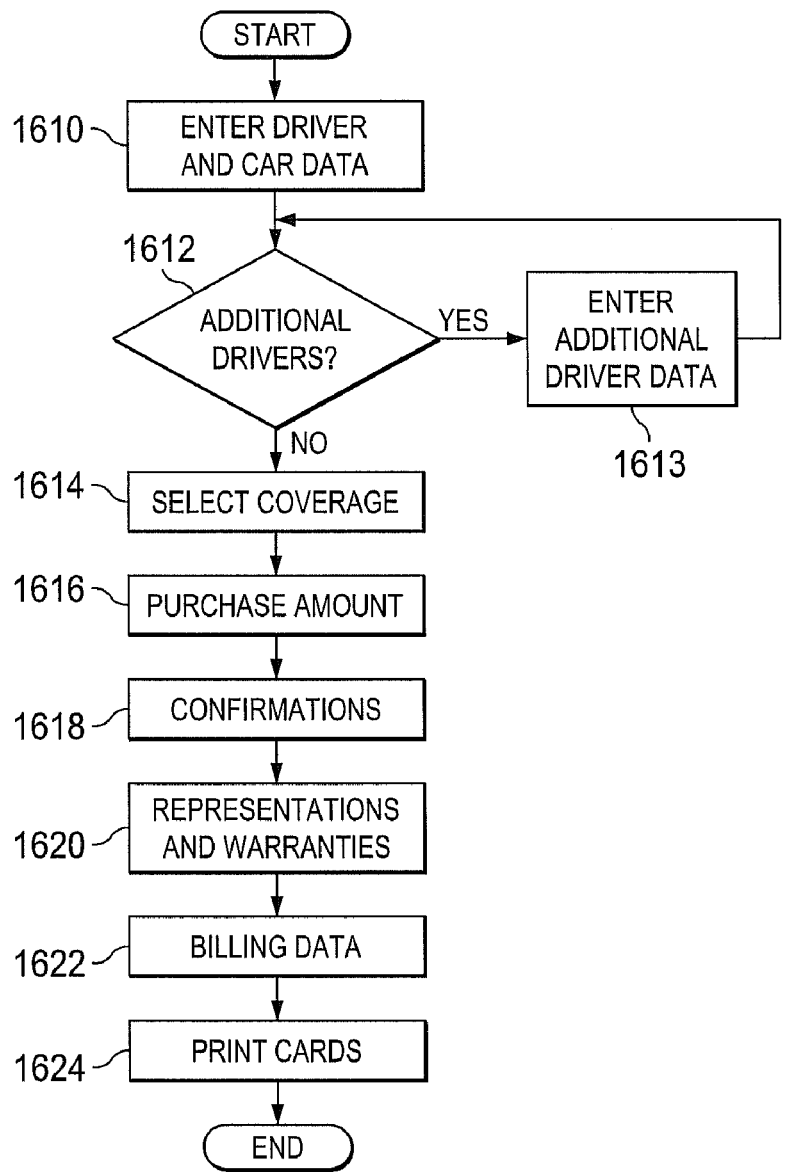
FIG. 16. is a flowchart of one embodiment of another method for assessing, pricing, and provisioning distance-based vehicle insurance.

Referring now FIG. 16, a flowchart of one embodiment of another method for assessing, pricing, and provisioning distance based vehicle insurance is shown. Additional references are made to FIGS. 17 through 22, which are exemplary screen shots illustrating various displays that could be implemented by the system of FIG. 2 or by other systems according to the present disclosure. At step 1610, customer information may be provided by the customer. Referring also now to FIG. 17, it can be seen that the customer information may include a number of items such as first name, last name, date of birth, gender, state, and zip code. In addition to driver information, vehicle information may also be collected in step 1610. Vehicle information may include the vehicle identification number and the current odometer reading of the vehicle. In the present embodiment, the vehicle identification number is used instead of the license plate number. The aforementioned customer information can be used in this embodiment instead of the driver's license number and associated database as was previously described.

Whenever an odometer reading is provided, at step 1610, it may be checked against internal or external databases for consistency. Internal databases may be maintained based on trusted odometer readings such as those from adjusters, state inspections, or other trusted sources. In some embodiments, the odometer reading may be checked against third party databases, possibly using the vehicle identification number or the license plate number as a key. In the event that the customer has provided an odometer reading that is not possible based on known and/or trusted data, the customer could be given another chance to enter a correct odometer reading and warned that any insurance contract is null and void if based on a falsified odometer reading. The start and end points (e.g., mileage) of the currently offered policy could be updated to reflect the known information regarding the present vehicle's mileage pending the entry of an accurate odometer reading by the customer. In other embodiments, a customer providing one or more odometer readings known to be false could be blacklisted and not offered a policy at all.

It can also be seen from FIG. 17 that the customer may have the option of adding additional drivers for the current automobile. As can be seen in FIG. 16 at step 1612, the system makes the determination as to whether additional drivers will be covered based on the input selected by the customer. If additional drivers are to be entered, the process proceeds to step 1613 where the additional driver information will be entered. It is understood that if additional driver information is to be provided in the present embodiment, the additional information would necessarily correspond to the already-entered vehicle identification number and odometer mileage. The process returns to step 1612 to determine if additional drivers are to be covered. If so, step 1613 is repeated.

Following the entry of all of the additional driver information, or if there is only a single driver as determined at step 1612, at step 1614 the customer will select a coverage amount. With reference now also to FIG. 18, it can be seen that a number of basic coverage options may be provided to the customer. As has been previously described, the price offered will correspond to the limits of liability chosen and to the car and driver (or drivers) to be covered based on known actuarial methods. In addition to basic coverages as shown in FIG. 18, other coverages may also be selectable by the customer. These additional coverages may include, but are not limited to, physical damage, towing and vehicle rental, uninsured motorist, and personal injury protection. As can be seen in FIG. 18, the basic coverage options as well as each of the additional coverage options are priced per unit of distance. In addition, the policy fee for administration of the insurance policy is computed on a per unit distance basis. In the present embodiment, this policy fee rate is shown along with the other insurance options and will be included in the total price.

At step 1616, the customer will choose the number of miles of insurance he or she wishes to purchase at the present time. Referring now also to FIG. 19, it can be seen that a total price per mile (unit distance) may be displayed which corresponds to the sum of all of the previously selected options plus the policy fee. In the present embodiment, the customer will be limited to purchasing miles of coverage in lots of 1,000, ranging from 1,000 up to 6,000. In other embodiments, the customer may be able to purchase more or fewer miles and may also be able to select his or her own denominations of miles needed.

It can also be seen from FIG. 19 that in the present embodiment the policy provides an expiration date. In one embodiment, the expiration date will be six months from the date of purchase, but in other embodiments other expiration time limits are possible. As described, not every embodiment will provide policies with an expiration date. Although not shown in FIG. 19, some embodiments may feature additional information on the screen, such as previous mileage-per-month data. A predictive feature indicating whether the mileage being purchased by the customer is projected to be adequate for the duration of the current policy may also be provided. Over time, this may be based, at least in part, on the "trusted-voluntary" readings previously described. It could also be based upon other readings including those from third parties such as state inspection agencies or sales and titling records. Third party databases, including commercial databases, could also be employed to aid in projecting mileage needs.

At step 1618, a confirmation page or pages may be provided to the customer as can be seen in FIG. 20. FIG. 20 represents one possible confirmation page, although it is understood that other formats or displays are possible. Information appearing on the confirmation page may include, but is not limited to, the drivers and vehicle covered, the current coverages and limits selected by the customer, the premium rate expressed as a cost per mile, the total number of miles selected by the customer for purchase, and the total policy cost. As can be seen, the policy period may also be defined or confirmed on the confirmation page. In some embodiments, the customer may be required to electronically initial certain rejections of coverages. In the example of FIG. 20, the customer has been required to initial a rejection of personal injury protection coverage. Also as can be seen in FIG. 20, it may be necessary for the customer to indicate whether or not a lien holder is associated with the vehicle. If so, an additional form (not shown) may be required for the customer to enter the lien holder information.

Figure 21:
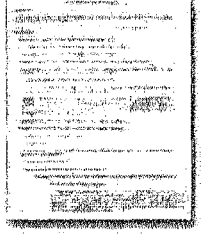

Following the confirmations at step 1618, representations and warranties may be provided at step 1620, as shown in FIG. 21. At this point, a number of assertions, representations, warranties and/or other statements may be required of the customer. As can be seen in FIG. 21, these questions and statements may involve licensing in a particular state, criminal charges, moving violations, purposes of the insured vehicle, and other data. The customer may be encouraged to carefully read all of the information presented, as shown in FIG. 21, and then be asked to electronically initial the from, thereby representing and warranting all of the stated facts.

In another embodiment, an odometer reading may be requested as a part of the representations and warranties step 1620. This odometer reading may be in addition to, or instead of, the odometer reading of step 1610. The requested odometer reading may be an initial "trusted-voluntary" reading as previously described. As with all customer provided odometer readings, the odometer reading provided as part of the representations and warranties step 1620 may be checked against internal or external databases. In another embodiment, where an odometer reading is not supplied at step 1620, the reading obtained at step 1610 may be verified at this point.

As previously described, in the event that the customer provides an odometer reading that is not possible based on known and/or trusted data, the customer may be given another chance to enter a correct odometer reading and warned that any insurance contract is null and void if based on a falsified odometer reading. The start and end points (e.g., mileage) of the currently offered policy may be updated to reflect the known information regarding the present vehicle's mileage, possibly pending the entry of an accurate odometer reading by the customer. In some embodiments, customers providing one or more odometer readings known to be false may be blacklisted and not offered a policy at all.

Following the representations and warranties at step 1620, at step 1622 billing data may be provided by the customer. Referring also now to FIG. 22, one form for entering billing information is shown. As can be seen, a credit card number may be provided, along with a billing address for the credit card. In other embodiments, other payment methods such as a checking account transfer may be utilized. In the present embodiment, at this step, the customer is also required to enter a physical garaging address for the vehicle to satisfy existing insurance requirements. Although the policy may be rated solely on information obtained previously, (e.g., zip code) customers may still be required to enter an actual physical street address. A garaging location of any vehicle that is insured may be required to bind the policy to the address of the vehicle. Following entry of the billing data at step 1622, at step 1624 the customer may have the option of printing liability cards, as may be required by state law. In other embodiments, the customer may be able to request that liability cards be physically mailed to his or her address.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. As described, some or all of the steps of each method may be implemented in the form of computer executable software instructions. Furthermore, the instructions may be located on a server that is accessible to many different clients, may be located on a single computer that is available to a user, or may be located at different locations. Therefore, the claims should be interpreted in a broad manner, consistent with the present disclosure. While various embodiments have been described for purposes of this disclosure, numerous changes and modifications will be apparent to those of ordinary skill in the art. Such changes and modifications are encompassed within the spirit of this invention as defined by the claims.

What is claimed is:

1. A computer system for assessing, pricing, and provisioning distance-based vehicle insurance comprising:
   a computer processor; and
   a computer memory accessible to the computer processor, the computer memory and computer processor being communicatively detached from a customer associated vehicle, wherein the computer memory comprises a plurality of instructions which, when executed by the computer processor, perform a method, the method comprising:
   receiving a vehicle identification number of a vehicle to be insured from a customer;
   receiving from the customer via a computer network a preliminary odometer reading of the vehicle to be insured, the customer providing the reading without an electronic tracking device attached to the vehicle or odometer and without a third party audit;
   providing a plurality of coverage types to the customer;
   providing the customer with at least one quote upon receiving an input selecting one of the coverage types, wherein the quote includes a policy rate identifying a cost per distance unit based on the customer and vehicle identification number;
   providing the customer with a plurality of pre-calculated items based on the quote, wherein each item includes a total number of distance units for purchase at the policy rate;
   performing a purchase transaction for an insurance policy in response to input from the customer electing one of the items for purchase, wherein coverage provided by the insurance policy is based on an expiration odometer value defined as the sum of a preliminary odometer reading and the total number of distance units included in the selected item;
   obtaining from the customer via the computer network a legally binding declaration that the preliminary odometer reading is true and accurate; and
   insuring the vehicle during a policy period defined by coverage for a preselected number of units distance from the preliminary odometer reading without a third party audit or electronic tracking device installed on the vehicle.

2. The system of claim 1, wherein the policy period is further defined by a predetermined expiration date after which no insurance will be provided under the policy period.

3. The system of claim 1, further comprising instructions for storing the preliminary odometer reading in a relational database record.

4. The system of claim 1, further comprising instructions for verifying the preliminary odometer reading against an internal database.

5. The system of claim 1, further comprising instructions for verifying a second odometer reading of the vehicle, before paying a claim.

6. The system of claim 1, further comprising instructions for verifying a second odometer reading of the vehicle before issuing a policy refund.

7. The system of claim 1, further comprising instructions for verifying a second odometer reading of the vehicle before rolling any over unearned units distance of coverage as credit to any subsequent policy for the customer.

8. The system of claim 1, further comprising instructions for accepting a subsequent odometer reading from the customer.

9. The system of claim 1, further comprising instructions for allowing the customer to provide a second preliminary odometer reading when it is determined that the first preliminary odometer reading is less than a previously reported odometer reading.

10. The system of claim 9, wherein the previously reported odometer reading is obtained from a trusted source other than the customer.

11. A computer system for assessing, pricing, and provisioning distance-based vehicle insurance comprising:
   a computer processor; and
   a computer memory accessible to the computer processor, the computer memory and computer processor being communicatively detached from a customer associated vehicle, wherein the computer memory comprises a plurality of instructions which, when executed by the computer processor, perform a method, the method comprising:
   receiving identification information of a customer and an associated vehicle;
   receiving from the customer via a computer network an original odometer reading of the vehicle from the customer and associating the reading in a database with the identification information of the vehicle, the customer providing the reading without an electronic tracking device attached to the vehicle or odometer and without a third party audit;
   providing a plurality of coverage types to the customer;
   providing the customer with at least one quote upon receiving an input selecting one of the coverage types, wherein the quote includes a policy rate identifying a cost per distance unit based on the customer and vehicle identification number;
   providing the customer with a plurality of pre-calculated items based on the quote, wherein each item includes a total number of distance units for purchase at the policy rate; and
   in response to input from the customer electing one of the items for purchase and upon receiving at least partial payment from the customer, insuring the vehicle during a policy period defined to be the earlier of the completion of travel by the vehicle of a preselected number of units distance and a predetermined expiration date, without a third party odometer audit or electronic monitoring device attached to the vehicle.

12. The system of claim 11, further comprising instructions for accepting at least one additional odometer reading from the customer, the additional odometer reading being subsequent to the original odometer reading, and instructions for associating the subsequent odometer reading in the database with the identification information of the vehicle.

13. The system of claim 12, further comprising instructions for determining a suggested number of units distance for a renewal insurance policy for the vehicle based on the original odometer reading and the at least one additional odometer reading.

14. The system of claim 11, further comprising instructions for obtaining a trusted odometer reading of the vehicle from a source other than the customer prior to settling a claim on the vehicle and instructions for dishonoring the claim if the trusted odometer reading is in excess of the original odometer reading plus the preselected number of units distance.

15. The system of claim 11, further comprising instructions for obtaining a trusted odometer reading of the vehicle from a source other than the customer prior to issuing a refund or credit for a policy on the vehicle.

* * * * *